United States Patent
Lee et al.

(10) Patent No.: US 10,120,473 B2
(45) Date of Patent: Nov. 6, 2018

(54) TOUCH SENSOR INTEGRATED TYPE DISPLAY DEVICE

(71) Applicant: LG Display Co., Ltd., Seoul (KR)

(72) Inventors: DeukSu Lee, Goyang-si (KR); Taeyun Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 115 days.

(21) Appl. No.: 14/958,509

(22) Filed: Dec. 3, 2015

(65) Prior Publication Data

US 2017/0160845 A1 Jun. 8, 2017

(51) Int. Cl.
| | |
|---|---|
| *G06F 3/041* | (2006.01) |
| *G06F 3/044* | (2006.01) |
| *G06F 3/047* | (2006.01) |
| *G02F 1/1333* | (2006.01) |
| *G02F 1/1335* | (2006.01) |
| *G02F 1/1343* | (2006.01) |
| *G02F 1/1368* | (2006.01) |
| *G02F 1/1362* | (2006.01) |

(52) U.S. Cl.
CPC .......... *G06F 3/0412* (2013.01); *G02F 1/1368* (2013.01); *G02F 1/13338* (2013.01); *G02F 1/133308* (2013.01); *G02F 1/133345* (2013.01); *G02F 1/133514* (2013.01); *G02F 1/133528* (2013.01); *G02F 1/134336* (2013.01); *G02F 1/134363* (2013.01); *G02F 1/136286* (2013.01); *G06F 3/044* (2013.01); *G06F 3/047* (2013.01); *G06F 3/0416* (2013.01); *G02F 2201/121* (2013.01); *G02F 2201/123* (2013.01); *G06F 2203/04111* (2013.01)

(58) Field of Classification Search
CPC . G06F 2203/04107; G06F 2203/04111; G06F 2203/04112; G06F 2203/04113; G06F 3/044; G06F 3/045; G06F 3/0412; G06F 3/047; G06F 3/0416; H05K 1/0287; H05K 1/0289; H05K 1/0296; H05K 1/092; H05K 9/0047; G02F 1/133528; G02F 1/136286; G02F 1/1368; G02F 1/134336; G02F 1/134363; G02F 1/133345; G02F 1/133514; G02F 1/13338; G02F 1/133308
USPC ....................................................... 345/174
See application file for complete search history.

(56) References Cited

U.S. PATENT DOCUMENTS

| | | | |
|---|---|---|---|
| 9,098,134 B2* | 8/2015 | Lee | G06F 3/041 |
| 9,256,310 B2* | 2/2016 | Han | G06F 3/0412 |
| 9,372,573 B2* | 6/2016 | Zhao | G06F 3/0412 |
| 9,436,331 B2* | 9/2016 | Jo | G06F 3/044 |
| 9,665,222 B2* | 5/2017 | Zhao | G06F 3/044 |
| 2012/0218199 A1* | 8/2012 | Kim | G06F 3/0412 |
| | | | 345/173 |

(Continued)

*Primary Examiner* — Grant Sitta
(74) *Attorney, Agent, or Firm* — Fenwick & West LLP

(57) ABSTRACT

Touch sensor integrated type display device improves display quality by preventing display defects due to electric field difference in pixels. The display device includes a plurality of gate lines and a plurality of data lines that cross each other, a plurality of combination touch and common electrodes, a plurality of main routing wires and a plurality of auxiliary routing wires. The plurality of combination touch and common electrodes have a same number of the plurality of main routing wires and the plurality of auxiliary routing wires that overlap each of the plurality of combination touch and common electrodes.

18 Claims, 8 Drawing Sheets

(56) References Cited

U.S. PATENT DOCUMENTS

| | | | |
|---|---|---|---|
| 2013/0241868 A1* | 9/2013 | Kim | G09G 3/3685 345/174 |
| 2013/0257794 A1* | 10/2013 | Lee | G06F 3/041 345/174 |
| 2013/0278557 A1* | 10/2013 | Hotelling | G06F 3/0412 345/174 |
| 2013/0321296 A1* | 12/2013 | Lee | G06F 3/041 345/173 |
| 2013/0335342 A1* | 12/2013 | Kim | G06F 3/044 345/173 |
| 2013/0335343 A1* | 12/2013 | Lee | G06F 3/0412 345/173 |
| 2014/0049509 A1* | 2/2014 | Shepelev | G06F 3/044 345/174 |
| 2014/0062907 A1* | 3/2014 | Kim | G06F 3/038 345/173 |
| 2014/0078414 A1* | 3/2014 | Lee | G06F 3/041 349/12 |
| 2014/0118277 A1* | 5/2014 | Kim | G06F 3/044 345/173 |
| 2014/0132526 A1* | 5/2014 | Lee | G06F 3/0412 345/173 |
| 2014/0132534 A1* | 5/2014 | Kim | G06F 3/0412 345/173 |
| 2014/0139480 A1* | 5/2014 | Seo | G06F 3/044 345/174 |
| 2014/0160086 A1* | 6/2014 | Lee | G06F 3/0418 345/178 |
| 2014/0184559 A1* | 7/2014 | Han | G06F 3/0412 345/174 |
| 2014/0184560 A1* | 7/2014 | Adachi | G06F 3/0412 345/174 |
| 2014/0210774 A1* | 7/2014 | Kim | G06F 3/044 345/174 |
| 2014/0240279 A1* | 8/2014 | Hwang | G06F 3/044 345/174 |
| 2015/0378486 A1* | 12/2015 | Yu | G06F 3/0412 345/174 |
| 2016/0209951 A1* | 7/2016 | Liu | G06F 3/044 |
| 2016/0283002 A1* | 9/2016 | Liu | G06F 3/0412 |
| 2016/0370944 A1* | 12/2016 | Zhao | G06F 3/041 |
| 2016/0378254 A1* | 12/2016 | Wang | G06F 3/044 345/174 |

* cited by examiner

TOUCH SENSOR INTEGRATED TYPE DISPLAY DEVICE

BACKGROUND

Field of the Invention

Embodiments of the invention relate to display devices, in particular touch sensor integrated type display devices.

Discussion of the Related Art

In recent years, various input devices, such as a keyboard, a mouse, a track ball, a joystick, and a digitizer, have been used to construct interfaces between users and home appliances or information and communication devices. However, when the user makes use of these input devices, the user's dissatisfaction increases because the user is required to learn how to use the input devices and the input devices occupy space, thereby making it difficult to achieve a high level of completeness in the products. Thus, a demand for a convenient and simple input device for the display device capable of reducing erroneous operations is increasing. In response to the increased demand, a touch sensor has been proposed to recognize information when the user inputs information by directly touching the screen or approaching the screen with his or her hand or a pen while he or she watches the display device.

The touch sensor has a simple configuration capable of reducing the erroneous operations. The user can also perform an input action without using a separate input device and can quickly and easily manipulate a display device through the contents displayed on the screen. Thus, the touch sensor has been applied to various display devices.

The touch sensor may be classified into an add-on type touch sensor, an on-cell type touch sensor, and an integrated type (or in-cell type) touch sensor, depending on its structure. The add-on type touch sensor may be configured such that the display device and a touch panel including the touch sensor are individually manufactured, and then the touch panel may be attached to an upper substrate of the display device. The on-cell type touch sensor may be configured such that the touch sensor may be directly formed on the surface of an upper glass substrate of the display device. The integrated type touch sensor may be configured such that the touch sensor may be mounted inside the display device to thereby achieve a thin profile display device and increase the durability of the display device.

The add-on type touch sensor causes the thickness of a display device to increase because the add-on type touch sensor has a structure in which the add-on type touch sensor is mounted on the display device. Further, visibility of the display device is reduced because of a reduction in a brightness of the display device resulting from the increased thickness.

The on-cell type touch sensor shares the glass substrate with the display device because the on-cell type touch sensor has the structure in which the on-cell type touch sensor is formed on the surface of the glass substrate of the display device. Therefore, a thickness of the display device using the on-cell type touch sensor is less than a thickness of the display device using the add-on type touch sensor. However, the entire thickness of the display device implementing the on-cell type touch sensor increases because of use of a touch driving electrode layer, a touch sensing electrode layer, and an insulating layer for insulating the touch driving electrode layer and the touch sensing electrode layer which constitute the on-cell type touch sensor.

Accordingly, development directions of the touch sensor are focused on the integrated type touch sensor in that it is possible to achieve a thin shape of the display device and enhance a durability of the display device, thereby resolving the problems of the add-on type and on-cell type touch sensors. The integrated type touch sensor may be classified into a light type touch sensor and a capacitive touch sensor depending on a method for sensing a touched portion. The capacitive touch sensor may be sub-classified into a self capacitive touch sensor and a mutual capacitive touch sensor.

The self capacitive touch sensor forms a plurality of independent patterns in a touch area of a touch sensing panel and measures changes in a capacitance of each independent pattern, thereby deciding whether or not a touch operation is performed. The mutual capacitive touch sensor crosses X-axis electrode lines (for example, driving electrode lines) and Y-axis electrode lines (for example, sensing electrode lines) in a touch/common electrode formation area of a touch sensing panel to form a matrix, applies a driving pulse to the X-axis electrode lines, and senses changes in voltages generated in sensing nodes defined as crossings of the X-axis electrode lines and the Y-axis electrode lines through the Y-axis electrode lines, thereby deciding whether or not a touch operation is performed.

In the mutual capacitive touch sensor, a mutual capacitance generated in touch recognition of the mutual capacitive touch sensor is very small, but parasitic capacitances between gate lines and data lines constituting the display device are very large. Therefore, it is difficult to accurately recognize touch positions because of the parasitic capacitances.

Further, because a plurality of touch driving lines for a touch driving operation and a plurality of touch sensing lines for a touch sensing operation have to be formed on the common electrode for the multi-touch recognition of the mutual capacitive touch sensor, the mutual capacitive touch sensor requires a very complex line structure.

On the other hand, because the self capacitive touch sensor has a simpler line structure than the mutual capacitive touch sensor, touch accuracy may increase. Hence, the self capacitive touch sensor has been widely used, if necessary or desired.

A related art liquid display device (hereinafter referred to as "touch sensor integrated type display device"), in which a self capacitive touch sensor is embedded, is described below with reference to FIGS. 1 to 2C. FIG. 1 is a planar view illustrating a related art touch sensor integrated type display device. FIG. 2A is a planar view schematically illustrating a relation between pixel electrodes and a touch/common electrode in an area corresponding to one touch and common electrode. FIG. 2B is a planar view illustrating a region R1 shown in FIG. 2A, and FIG. 2C is a cross sectional view illustrating a region R2 shown in FIG. 2A.

Referring to FIG. 1, the touch sensor integrated display device includes an active area AA, in which touch/common electrodes are arranged and data are displayed, and a bezel area BA positioned outside the active area AA. In the bezel area BA, various wires and a source and touch driving integrated circuit 10 are disposed.

The active area AA includes a plurality of touch/common electrodes Tx11 to Tx14, Tx21 to Tx24, . . . , and Tx51 to Tx54, and a plurality of touch routing wires TW11 to TW14, TW21 to TW24, . . . , and TW51 to TW54 connected to the plurality of touch/common electrodes Tx11 to Tx14, Tx21 to Tx24, . . . , and Tx51 to Tx54, respectively. The plurality of touch/common electrodes Tx11 to Tx14, Tx21 to Tx24, . . . , and Tx51 to Tx54 are arranged in a first direction (e.g. x-axis direction) and a second direction (e.g. y-axis direction) which cross each other. The plurality of routing wires TW11 to TW15, TW 21 to TW25, . . . , and TW81 are arranged in parallel to each other in the second direction.

The plurality of touch/common electrodes Tx11 to Tx14, Tx21 to Tx24, . . . , and Tx51 to Tx54 are formed by dividing a common electrode of a display device. The plurality of touch/common electrodes Tx11 to Tx14, Tx21 to Tx24, . . . , and Tx51 to Tx54 are operated as common electrodes during a display mode for displaying data, and operated as touch/common electrodes during a touch mode for perceiving touch positions.

The bezel area BA is positioned outside the active area AA, and includes various wires and the source and touch driving integrated circuit 10. The source and touch driving integrated circuit 10 supplies display data to data lines in synchronization with driving of gate lines (not shown) of the display device, and supplies a common voltage to the touch/common electrodes Tx11 to Tx14, Tx21 to Tx24, . . . , and Tx51 to Tx54 during the display mode. Also, the source and touch driving integrated circuit 10 supplies a touch driving voltage to the touch/common electrodes Tx11 to Tx14, Tx21 to Tx24, . . . , and Tx51 to Tx54, and determines touch positions at which touches are performed by scanning changes of capacitance in the touch/common electrodes before and after the touch is performed during the touch mode. The various wires disposed in bezel area BA include the touch routing wires TW11 to TW14, TW21 to TW24, . . . , and TW51 to TW54, gate lines and data lines (not shown) extended from the active area AA and connected to the source and touch driving integrated circuit 10.

As described above, when conductive objects such as fingers or stylus pens are touched on the active area AA of the touch sensor integrated type display device, it is possible to determine touch positions at which touches are performed by scanning changes of capacitance in touch/common electrodes before and after the touch is performed. More specifically, a touch driving voltage is supplied to the touch/common electrodes Tx11 to Tx14, Tx21 to Tx24, . . . , and Tx51 to Tx54 in the active area AA, and then the touch/common electrodes Tx11 to Tx14, Tx21 to Tx24, . . . , and Tx51 to Tx54 are sensed via the touch routing wires TW11 to TW14, TW 21 to TW24, . . . , and TW51 to TW54. It is possible to determine touch positions at which touches are performed by using a known touch algorithm based on changes of capacitance in the touch/common electrodes before and after the touch is performed.

However there are some problems such as a mura defect in the touch sensor integrated type display device. This is due to the fact that an electric field difference is generated in pixels according to positions of routing wires TW11 to TW14, TW21 to TW24, . . . , and TW51 to TW54 connected the touch/common electrodes Tx11 to Tx14, Tx21 to Tx24, . . . , and Tx51 to Tx54. That is, because the positions of the routing wires TW11 to TW14, TW21 to TW24, . . . , and TW51 connected to the touch/common electrodes Tx11 to Tx14, Tx21 to Tx24, . . . , and Tx51 to Tx54 are different from each other, electric fields at particular positions are different. Hereinafter, the reason of the mura defect generation is more detailed described with reference to FIGS. 2A to 2C.

In the FIGS. 2A to 2C, it is omitted to describe constructional elements disposed under the data lines to obviate complication of description. In example of FIG. 2A, one touch/common electrode Tx11 has a size corresponding to three pixels in a horizontal direction and the three pixels in a vertical direction, that total 9 pixels P11 to P13, P21 to P23 and P31 to P33.

Referring to FIGS. 2A to 2C, data lines DL1 to DL3 disposed on a gate insulation layer GI covering the gate lines GL1 to GL3. The Pixel electrodes P11 to P13, P21 to P23 and P31 to P33 are disposed on an insulation layer covering the data lines DL1 to DL6. The routing wire TW11 is disposed on a first passivation layer PAS1 covering the pixel electrodes P11 to P13, P21 to P23 and P31 to P33. The other routing wires TW12 to TW14, TW21 to TW24, . . . and TW51 to TW54 shown in FIG. 1 are also disposed on the first passivation layer PAS1. The touch/common electrode Tx11 is disposed on a second passivation layer PAS2 covering the routing wire TW11. The other touch and common electrodes Tx12 to Tx14, Tx21 to Tx24, . . . and Tx51 to Tx54 shown in FIG. 1 are also disposed on the second passivation layer PAS2. The touch and common electrode Tx11 is connected to the routing wire TW11 exposed through a contact hole CH1 of the second passivation layer PAS2.

In the touch sensor integrated type display device, there are two regions R1 and R2 in one touch and common electrode (for example, Tx11). The first region R1 is a region where the routing wire TW11 is disposed to overlap the data line DL1. The second region R2 is a region where no routing wire is disposed to overlap the data line DL1.

For example, in the touch/common electrode Tx11, the routing wire TW11 overlaps the first data line DL1 passing though the touch and common electrode Tx11. However there are no routing wire to be overlapped with the second to third data lines DL2 to DL3 passing though the touch/common electrode Tx11. Accordingly, the first data line DL1 overlaps the first routing wire TW11 and is disposed to be neighbored to the pixel electrodes P11, P21 and P31. Electric field between the first data line DL1 and the pixel electrodes P11, P21 and P31 is blocked by the routing wire TW11 as shown in FIGS. 2A and 2B. Accordingly, the pixel electrodes P11, P21 and P31 are not affected by a data voltage supplied to the second to third data lines. However, the pixel electrodes P12, P22, P32; P13, P23, and P33 are affected by data voltages supplied to the second to third data lines DL2 to DL3 because the second to third data lines DL2 to DL3 are not overlapped with the routing wire as shown in FIGS. 2A and 2C. Accordingly, a mura defect is generated in the touch and common electrode Tx11 of the sensor integrated type display device.

Also, there is no parasitic capacitance in the region R1 because the electric field between the first data line DL1 and the pixel electrode P11, P21 and P31 is blocked by the routing wire TW11. However, there are parasitic capacitances in the region R2 because the electric field between the second to third data lines DL2 to DL3 and the pixel electrode P12, P22, P32; P13, P23, and P33 affect a liquid crystal layer as shown in FIGS. 2A and 2C.

The parasitic capacitance obstructs normal driving of liquid crystal molecules during a display operation, thereby causing display defects due to a light leakage

SUMMARY

Embodiments of the invention provide touch sensor integrated type display devices capable of improving display quality by preventing display defects due to electric field difference in the pixels.

In one object of the invention, there is a touch sensor integrated type display device having an active area and a bezel area outside the active area, comprising: a plurality of gate lines; a plurality of data lines configured to cross over the plurality of gate lines; a plurality of pixel electrodes configured to be disposed between the plurality of data lines; a plurality of touch/common electrodes, each of the plurality of touch/common electrodes configured to be overlapped with m×n pixel electrodes in the active area, wherein the m is a number of the pixel electrodes arranged in a first direction and the n is a number of the pixel electrodes arranged in a second direction crossing the first direction, and the m and n are a positive integer same to or larger than two; a plurality of main routing wires, each of the plurality of main routing wires being connected to each of the plurality of touch/common electrode, and extended from the active area to one side of the bezel area; and at least one auxiliary routing wire configured to be connected to each of the plurality of touch/common electrodes in an area corresponding to the each touch/electrode, and to be in parallel with the plurality of main routing wires, wherein a total number of the main and auxiliary routing wires disposed to overlap each of the plurality of touch/common electrode is same.

In another object of the invention, there is a touch sensor integrated type display device having an active area and a bezel area outside the active area, comprising: a plurality of gate lines; a plurality of data lines configured to cross over the plurality of gate lines; a plurality of pixel electrodes configured to be disposed between the plurality of data lines; a plurality of touch/common electrodes, each of the plurality of touch/common electrodes configured to be overlapped with m pixel electrodes arranged in a first direction and n pixel electrodes arranged in a second direction crossing the first direction in the active area, wherein m and n are a positive integer same to or larger than two; a plurality of main routing wires, each of the plurality of main routing wires configured to be respectively connected to the plurality of touch/common electrodes, be arranged in parallel with each other, and be overlapped with some of the plurality of data lines; and a plurality of auxiliary routing wires configured to be connected to the plurality of touch/common electrodes, and to be overlapped with others of the plurality of data lines.

In the touch sensor integrated type display device of the invention, the main routing wires and auxiliary routing wires overlap all data lines disposed in an area corresponding to each touch/common electrode. The electric field formed between the data lines and the pixel electrodes is blocked by the main routing wires and auxiliary routing wires. Accordingly, it is possible to prevent display defect such as mura phenomenon due to light leakage because the electric field between the data lines and the pixel electrodes does not affect the liquid crystal layer of the display device.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the invention, examples of which are illustrated in the accompanying drawings. Where possible, the same or similar reference numbers may be used throughout the drawings to refer to the same or similar parts. In the following description, a self-capacitive touch sensor integrated type liquid crystal display may be used as an example of a touch sensor integrated type display device, but embodiments are not limited thereto. Therefore, hereinafter a self-capacitive touch sensor integrated type liquid crystal display is simply referred to as a touch sensor integrated type display device.

Figure 1:
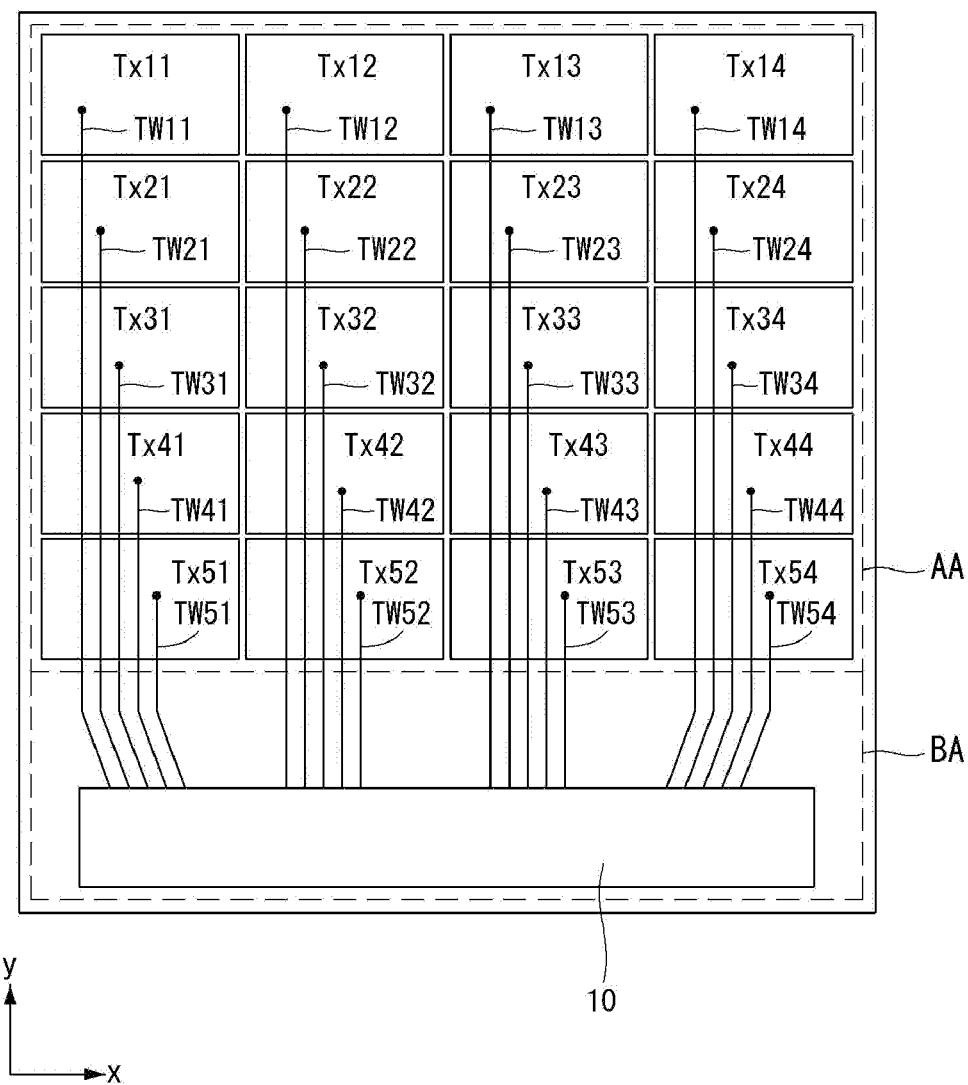
FIG. 1 is a planar view illustrating a touch sensor integrated type display device according to a related art.
Figure 2A:
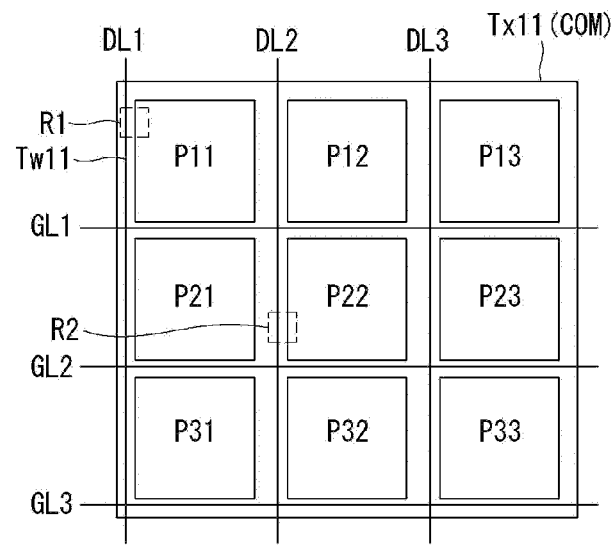
FIG. 2A is a planar view schematically illustrating a relation between pixel electrodes and a touch/common electrode in an area corresponding to one touch/common electrode.
Figure 2B:
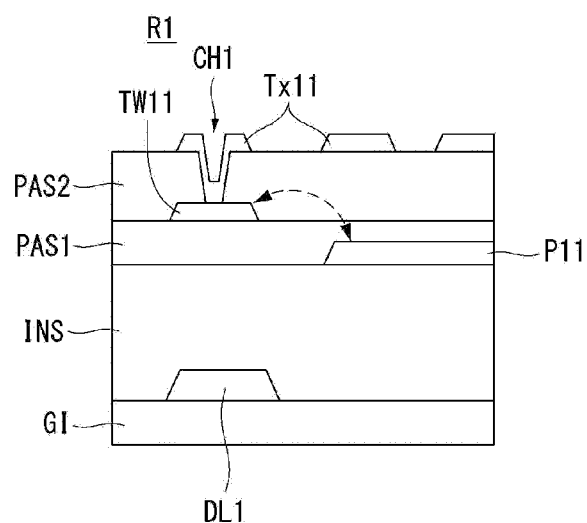
FIG. 2B is a cross-sectional view illustrating a region R1 shown in FIG. 2A.
Figure 2C:
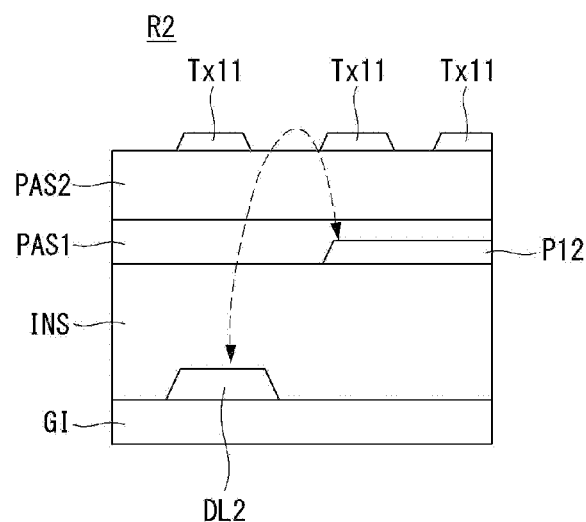
FIG. 2C is a cross-sectional view illustrating a region R2 shown in FIG. 2A.
Figure 3:
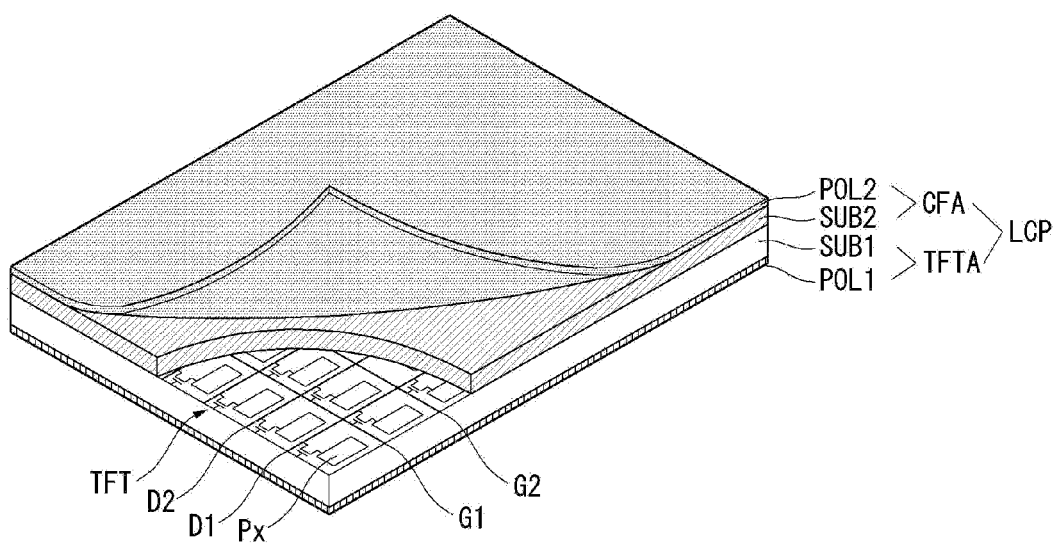
FIG. 3 is a partial exploded perspective view schematically illustrating a touch sensor integrated type display device according to an exemplary embodiment of the disclosure.
Figure 4:
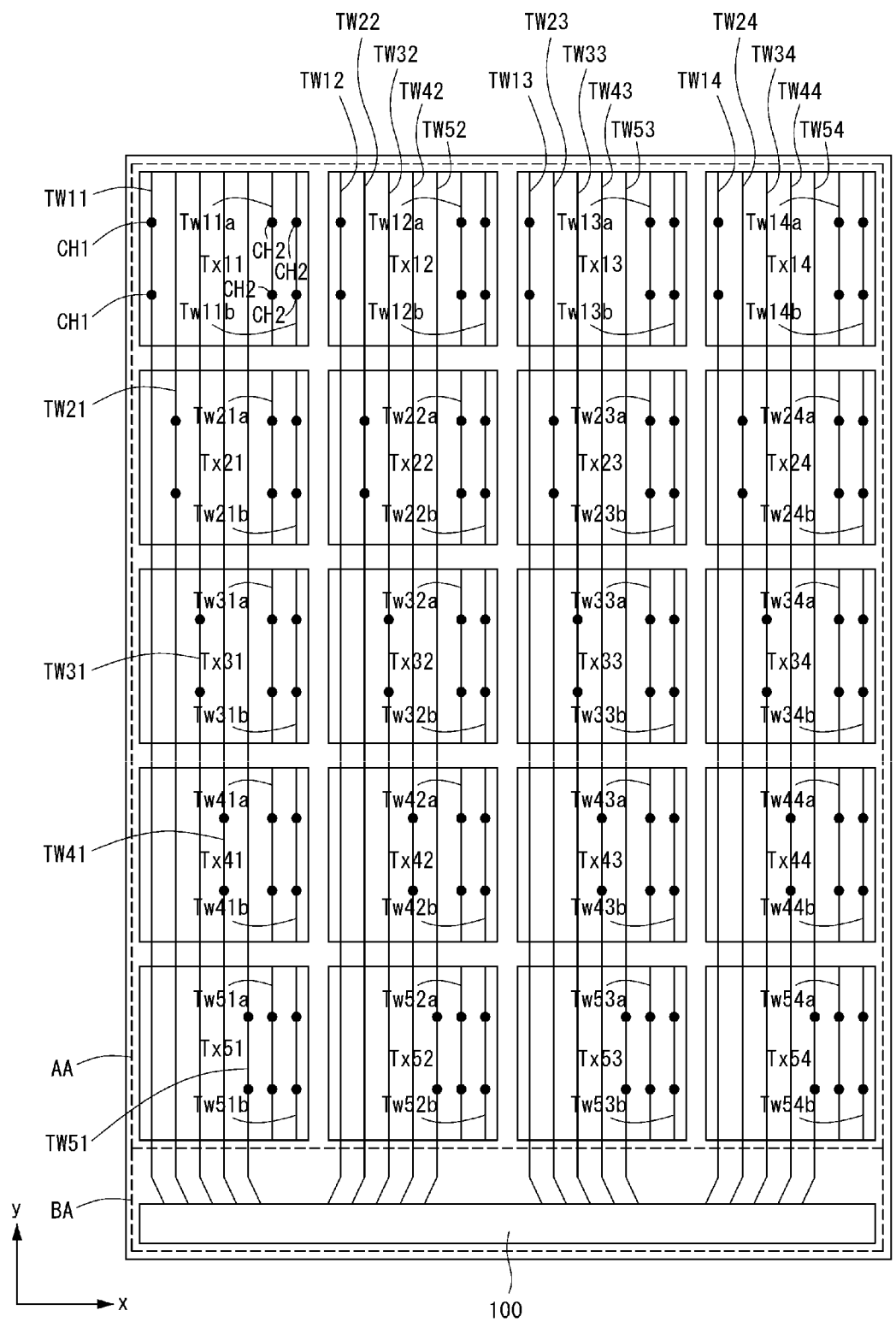
FIG. 4 is a planar view illustrating a touch sensor integrated type display device according to a first exemplary embodiment of the disclosure.
Figure 5:
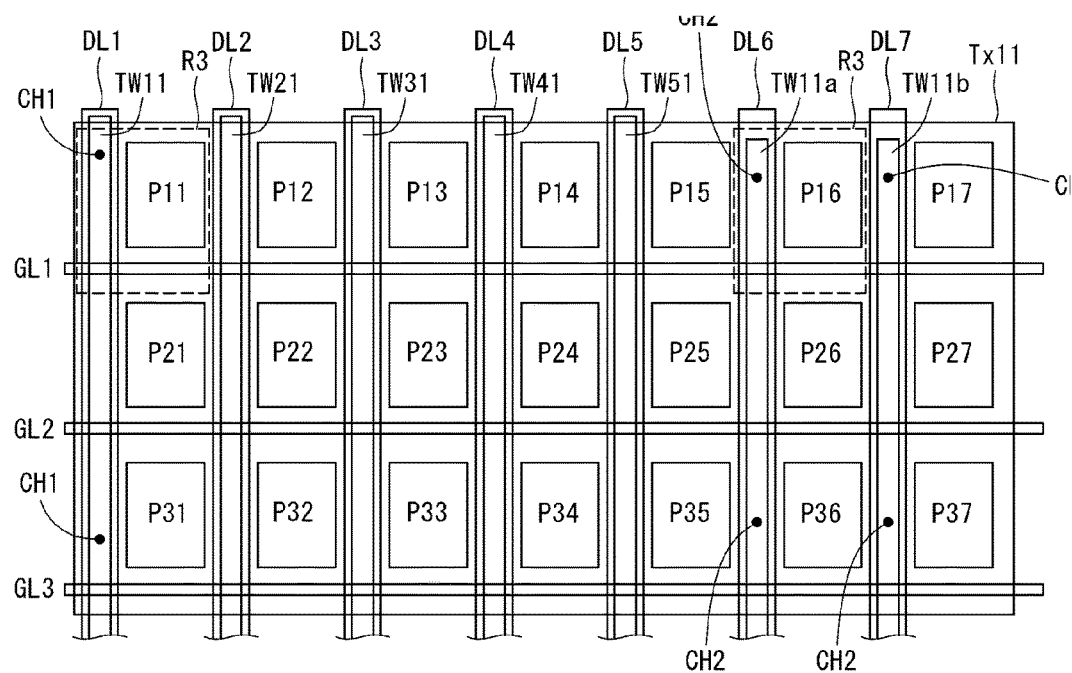
FIG. 5 is a cross-sectional view schematically illustrating a relation between pixel electrodes and one touch and common electrode shown in FIG. 4.

A touch sensor integrated type display device, to which example embodiments of the invention are applied, is described with reference to FIGS. 3 to 5. FIG. 3 is a partial exploded perspective view schematically illustrating a touch sensor integrated type display device according to an exemplary embodiment of the invention. FIG. 4 is a planar view illustrating a touch sensor integrated type display device according to a first exemplary embodiment of the disclosure. FIG. 5 is a cross-sectional view schematically illustrating a relation between pixel electrodes and one touch and common electrode shown in FIG. 4

Referring to FIG. 3, the touch sensor integrated type display device includes a liquid crystal display panel LCP having a thin film transistor (TFT) array TFTA and a color filter array CFA which are positioned opposite each other with a liquid crystal layer (not shown) interposed there between.

The TFT array TFTA includes a plurality of gate lines G1 and G2 which may be arranged in parallel in a first direction (for example, x-axis direction) on a first substrate SUB1, a plurality of data lines D1 and D2 which may be arranged in parallel in a second direction (for example, y-axis direction) to cross over the plurality of gate lines G1 and G2, thin film transistors TFT disposed at crossings of the gate lines G1 and G2 and the data lines D1 and D2, a plurality of pixel electrodes P for charging data voltages to liquid crystal cells, and a plurality of touch/common electrodes Tx11 to Tx14, Tx21 to Tx24, ... and Tx51 to Tx54 disposed to overlap the pixel electrodes P.

The color filter array CFA includes black matrices (not shown) and color filters (not shown), which may be disposed on a second substrate SUB2. Polarizing plates POL1 and POL2 are respectively attached to external surfaces of the first substrate SUB1 and the second substrate SUB2 of the liquid crystal display panel LCP. Alignment layers (not shown) for setting a pre-tilt angle of liquid are respectively formed on inner surfaces of the first and second substrates SUB1 and SUB2 contacting the liquid crystals. A column spacer may be disposed between the TFT array TFTA and the color filter array CFA of the liquid crystal display panel LCP to maintain cell gaps of the liquid crystal cells.

The common electrode may be disposed on the second substrate SUB2 in a vertical electric field driving manner, such as a twisted nematic (TN) mode and a vertical alignment (VA) mode. Further, the common electrode may be disposed on the first substrate SUB1 along with the pixel electrodes P in a horizontal electric field driving manner, such as an in-plane switching (IPS) mode and a fringe field switching (FFS) mode. In the following description, embodiments of the invention will be described based on the horizontal electric field driving manner by way of example.

Referring to FIG. 4, the touch sensor integrated display device according to the first embodiment of the disclosure includes an active area AA and a bezel area BA positioned outside the active area AA. The active area AA is an area where pixel electrodes, touch/common electrodes Tx11 to Tx54 and so on are disposed and data are displayed. The bezel area BA is an area where various wires and a driving integrated circuit 100 may be disposed. The driving integrated circuit 100 supplies a common voltage to touch/common electrodes (which will be described later) during a display operation period and a touch driving signal to the touch/common electrodes during a touch operation period. The display operation period and the touch operation period may be set by time-dividing one frame period.

The active area AA includes a plurality of touch/common electrodes Tx11 to Tx14, Tx21 to Tx24, Tx31 to Tx34, Tx41 to Tx44, and Tx51 to Tx54, a plurality of main routing wires TW11 to TW14, TW21 to TW24, TW31 to TW34, TW41 to TW44 and TW51 to TW54, and a plurality of auxiliary routing wires TW11a, TW11b; TW12a, TW12b; TW13a, TW13b; TW14a, TW14b; TW21a, TW21b; TW22a, TW22b; TW23a, TW23b; TW24a, TW24b; TW31a, TW31b; TW32a, TW32b; TW33a, TW33b; TW34a, TW34b; TW41a, TW41b; TW42a, TW42b; TW43a, TW43b; TW44a, TW44b; TW51a, TW51b; TW52a, TW52b; TW53a, TW53b; and TW54a, TW54b.

The plurality of touch/common electrodes Tx11 to Tx14, Tx21 to Tx24, Tx31 to Tx34, Tx41 to Tx44 and Tx51 to Tx54 are formed by dividing a common electrode of a display device. The plurality of touch/common electrodes Tx11 to Tx14, Tx21 to Tx24, Tx31 to Tx34, Tx41 to Tx44 and Tx51 to Tx54 are divided in a first direction (e.g. x-axis direction) and a second direction (e.g. y-axis direction) which cross each other. The plurality of touch/common electrodes Tx11 to Tx14, Tx21 to Tx24, Tx31 to Tx34, Tx41 to Tx44 and Tx51 to Tx54 may be operated as common electrodes during a display mode for displaying data, and operated as touch/common electrodes during a touch mode for perceiving touch positions.

The plurality of main routing wires TW11 to TW14, TW21 to TW24, TW31 to TW34, TW41 to TW44 and TW51 to TW54 are connected to the plurality of touch/common electrodes Tx11 to Tx14, Tx21 to Tx24, Tx31 to Tx34, Tx41 to Tx44 and Tx51 to Tx54, respectively. The plurality of main routing wires TW11 to TW14, TW 21 to TW24, TW31 to TW34, TW41 to TW44 and TW51 to TW54 are arranged in parallel in the second direction. The plurality of main routing wires TW11 to TW14, TW21 to TW24, TW31 to TW34, TW41 to TW44 and TW51 to TW54 have a same length in the active area AA.

If the main routing wires have a same length in the active area AA, it is possible to a display defect such as a brightness difference between touch/common electrodes because capacitance of the touch/common electrodes to the routing wires is same.

The plurality of auxiliary routing wires TW11a, TW11b; TW12a, TW12b; TW13a, TW13b; TW14a, TW14b; TW21a, TW21b; TW22a, TW22b; TW23a, TW23b; TW24a, TW24b; TW31a, TW31b; TW32a, TW32b; TW33a, TW33b; TW34a, TW34b; TW41a, TW41b; TW42a, TW42b; TW43a, TW43b; TW44a, TW44b; TW51a, TW51b; TW52a, TW52b; TW53a, TW53b; and TW54a, TW54b are independently disposed in the touch/common electrodes Tx11 to Tx14, Tx21 to Tx24, Tx31 to Tx34, Tx41 to Tx44 and Tx51 to Tx54, and connected to the touch/common electrodes Tx11 to Tx14, Tx21 to Tx24, Tx31 to Tx34, Tx41 to Tx44 and Tx51 to Tx54, respectively. The plurality of auxiliary routing wires TW11a, TW11b; TW12a, TW12b; TW13a, TW13b; TW14a, TW14b; TW21a, TW21b; TW22a, TW22b; TW23a, TW23b; TW24a, TW24b; TW31a, TW31b; TW32a, TW32b; TW33a, TW33b; TW34a, TW34b; TW41a, TW41b; TW42a, TW42b; TW43a, TW43b; TW44a, TW44b; TW51a, TW51b; TW52a, TW52b; TW53a, TW53b; and TW54a, TW54b are also arranged in parallel in the second direction. The plurality of auxiliary routing wires TW11a, TW11b; TW12a, TW12b; TW13a, TW13b; TW14a, TW14b; TW21a, TW21b; TW22a, TW22b; TW23a, TW23b; TW24a, TW24b; TW31a, TW31b; TW32a, TW32b; TW33a, TW33b; TW34a, TW34b; TW41a, TW41b; TW42a, TW42b; TW43a, TW43b; TW44a, TW44b; TW51a, TW51b; TW52a, TW52b; TW53a, TW53b; and TW54a, TW54b have a same length in each of the touch and common electrodes Tx11 to Tx14, Tx21 to Tx24, Tx31 to Tx34, Tx41 to Tx44 and Tx51 to Tx54.

A touch sensor integrated type display device is further described with reference to FIGS. 4 and 5.

Referring to FIGS. 4 and 5, the plurality of touch and common electrodes Tx11 to Tx14, Tx21 to Tx24, Tx31 to Tx34, Tx41 to Tx44 and Tx51 to Tx54 are arranged in five rows and four columns.

The plurality of main routing wires TW11 to TW14, TW 21 to TW24, TW31 to TW34, TW41 to TW44 and TW51 to TW54 are connected to the plurality of touch/common electrodes Tx11 to Tx14, Tx21 to Tx24, Tx31 to Tx34, Tx41 to Tx44 and Tx51 to Tx54, via first contact holes CH1, respectively. Four main routing wire groups are arranged to pass through the touch/common electrodes Tx11 to Tx51, Tx12 to Tx52, Tx13 to Tx53 or Tx14 to Tx54 disposed in each of four columns. That is, a first main routing wire group TW11, TW21, TW31, TW41 and TW51 pass through the first touch/common electrode group Tx11, Tx21, Tx31, Tx41 and Tx51 disposed in a first column. A second main routing wire group TW12, TW22, TW32, TW42 and TW52 pass through the second touch/common electrode group Tx12, Tx22, Tx32, Tx42 and Tx52 disposed in a second column. A third main routing wire group TW13, TW23, TW33, TW43 and TW53 pass through the third touch/common electrode group Tx13, Tx23, Tx33, Tx43 and Tx53 disposed in a third column. A fourth main routing wire group TW14, TW24, TW34, TW44 and TW54 pass through the fourth touch/common electrode group Tx14, Tx24, Tx34, Tx44 and Tx54 disposed in a fourth column. As a result, a number of the main routing wires belonging to each main routing wire group passing through the touch and common electrode group disposed in one column is the same as the number of row of the touch/common electrodes disposed in the active area AA or may be multiples of the number of row of touch and common electrodes disposed in the active area AA.

In the exemplary embodiment of the disclosure, the number of the main routing wires belonging to each main routing wire group passing through the touch/common electrode group disposed in one column is the same as the number of rows of touch/common electrodes disposed in the active area AA. Referring to FIG. 4, the touch/common electrodes Tx11 to Tx54 are arranged in five rows and four columns. Also any one of five routing wires belonging to each routing wire group is arranged to be connected to one touch/common electrode, and the other four routing wires are arranged to overlap the one touch/common electrode. Referring to the touch electrode Tx11 disposed in first row and first column, a 1-1 routing wire TW11 belonging to the first routing wire group is connected to the touch/common electrode Tx11 via at least one contact hole CH1. 1-2 to 1-5 routing wires TW21, TW31, Tw41 and TW51 are arranged to overlap the one touch/common electrode without connecting the touch and common electrode Tx11.

The plurality of auxiliary routing wires TW11a, TW11b; TW12a, TW12b; TW13a, TW13b; TW14a, TW14b; TW21a, TW21b; TW22a, TW22b; TW23a, TW23b; TW24a, TW24b; TW31a, TW31b; TW32a, TW32b; TW33a, TW33b; TW34a, TW34b; TW41a, TW41b; TW42a, TW42b; TW43a, TW43b; TW44a, TW44b; TW51a, TW51b; TW52a, TW52b; TW53a, TW53b; and TW54a, TW54b are connected to the touch/common electrodes Tx11 to Tx51, Tx12 to Tx52, Tx13 to Tx53 or Tx14 to Tx54 via at least one second contact hole CH2, respectively.

In the exemplary embodiment of the invention, the number of plurality of auxiliary routing wires may be determined based on the number of the data lines disposed in an area corresponding to one touch/common electrode. For example, the number of plurality of auxiliary routing wires arranged in the area corresponding to one touch/common electrode may be set to the number of the data lines which are not overlapped with the main routing wires. Accordingly, all of the data lines in the active area AA may be overlapped with the main and auxiliary routing wires.

Hereinafter, a relation between pixel electrodes and one touch/common electrode will be described with reference to FIG. 5. FIG. 5 is a cross-sectional view schematically illustrating a relation between pixel electrodes P11 to P17, P21 to P27, and P31 to P37, data lines DL1 to DL7 and gate lines GL1 to GL3 corresponding to the touch/common electrode (Tx11 disposed in a first row and a first column shown in FIG. 4.

Referring to FIG. 5, the pixel electrodes P11 to P17, P21 to P27 and P31 to P37 arranged in three rows and seven columns are disposed to overlap the one touch and common electrode Tx11. The pixel electrodes P11 to P17, P21 to P27 and P31 to P37 are disposed in areas defined by the data lines DL1 to DL7 and gate lines GL1 to GL3. In the exemplary embodiment of the disclosure, one main routing wire is connected to one touch/common electrode, and the touch and common electrodes are arranged in five rows as shown in FIG. 4. Also, seven data lines are assigned to the one touch/common electrode. For example, the data lines D1 to D7 are assigned to the touch/common electrode Tx11. Accordingly, the 1-1 main routing wire TW11 is disposed to overlap the 1-1 data line DL1, and the 2-1 to 5-1 main routing wire TW21, TW31, TW41 and TW51 are disposed to overlap the 1-2 to 1-5 data lines DL2 to DL5. Also, the 1-1a and 1-1b auxiliary routing wire TW11a and TW11b are disposed to overlap the 1-6 and 1-7 data lines DL6 and DL7.

The connection relationship between the main and auxiliary routing wires and the touch and common electrodes will be described with reference to FIGS. 4 and 5.

The 1-1 touch/common electrode Tx11 among the touch/common electrodes Tx11 to Tx51 disposed in a first column is connected to the 1-1 main routing wire TW11 via at least one first contact hole CH1. The 1-1 main routing wire TW11 is overlapped with the 2-1 to 5-1 touch/common electrodes Tx21 to Tx51 disposed in the first column but is not connected to them. The 1-1 main the routing wire TW11 is arranged in parallel with the 2-1 to 5-1 main routing wires TW21 to TW51. The 1-1a and 1-1b auxiliary routing wires TW11a and TW11b are connected to the 1-1 touch/common electrode Tx11 via at least one second contact holes CH2, respectively. The 1-1a and 1-1b auxiliary routing wires TW11a and TW11b are arranged in parallel with the 2-1 to 5-1 main routing wires TW11 to TW51. The 1-1a and 1-1b auxiliary routing wires TW11a and TW11b are disposed in the area corresponding to the 1-1 touch/common electrode Tx11.

The 2-1 touch/common electrode Tx21 among the touch/common electrodes Tx11 to Tx51 disposed in the first column is connected to the 2-1 main routing wire TW21 via at least one first contact hole CH1. The 2-1 main routing wire TW21 is overlapped with the 1-1, 3-1, 4-1 and 5-1 touch/common electrodes Tx11, Tx31, Tx41 and Tx51 disposed in the first column but is not connected to them. The 2-1 main the routing wire TW21 is arranged in parallel with the 1-1, 3-1, 4-1 and 5-1 main routing wires TW11, TW31, TW41 and TW51. The 2-1a and 2-1b auxiliary routing wires TW21a and TW21b are connected to the 2-1 touch/common electrode Tx21 via at least one second contact holes CH2, respectively. The 2-1a and 2-1b auxiliary routing wires TW21a and TW21b are arranged in parallel with the 1-1 to 5-1 main routing wires TW11 to TW51. The 2-1a and 2-1b auxiliary routing wires TW21a and TW21b are disposed in the area corresponding to the 2-1 touch and common electrode Tx21.

The 3-1 touch and common electrode Tx31 among the touch and common electrodes Tx11 to Tx51 disposed in the first column is connected to the 3-1 main routing wire TW31 via at least one first contact hole CH1. The 3-1 main routing wire TW31 is overlapped with the 1-1, 2-1, 4-1 and 5-1 touch/common electrodes Tx11, Tx21, Tx41 and Tx51 disposed in the first column but is not connected to them. The 3-1 main the routing wire TW13 is arranged in parallel with the 1-1, 2-1, 4-1 and 5-1 main routing wires TW11, TW21, TW41 and TW51. The 3-1a and 3-1b auxiliary routing wires TW31a and TW31b are connected to the 3-1 touch/common electrode Tx31 via at least one second contact holes CH2, respectively. The 3-1a and 3-1b auxiliary routing wires TW31a and TW31b are arranged in parallel with the 1-1 to 5-1 main routing wires TW11 to TW51. The 3-1a and 3-1b auxiliary routing wires TW31a and TW31b are disposed in the area corresponding to the 3-1 touch/common electrode Tx31.

The 4-1 touch/common electrode Tx41 among the touch/common electrodes Tx11 to Tx51 disposed in the first column is connected to the 4-1 main routing wire TW41 via at least one first contact hole CH1. The 4-1 main routing wire TW41 is overlapped with the 1-1, 2-1, 3-1 and 5-1 touch/common electrodes Tx11, Tx21, Tx31 and Tx51 disposed in the first column but is not connected to them. The 4-1 main the routing wire TW41 is arranged in parallel with the 1-1, 2-1, 3-1 and 5-1 main routing wires TW11, TW21, TW31 and TW51. The 4-1a and 4-1b auxiliary routing wires TW41a and TW41b are connected to the 4-1 touch/common electrode Tx41 via at least one second contact holes CH2, respectively. The 4-1a and 4-1b auxiliary routing wires TW41a and TW41b are arranged in parallel with the 1-1 to 5-1 main routing wires TW11 to TW51. The 4-1a and 4-1b auxiliary routing wires TW41a and TW41b are disposed in the area corresponding to the 4-1 touch/common electrode Tx41.

The 5-1 touch/common electrode Tx51 among the touch and common electrodes Tx11 to Tx51 disposed in the first column is connected to the 5-1 main routing wire TW51 via at least one first contact hole CH1. The 5-1 main routing wire TW51 is overlapped with the 1-1, 2-1, 3-1 and 4-1 touch/common electrodes Tx11, Tx21, Tx31 and Tx41 disposed in the first column but is not connected to them. The 5-1 main the routing wire TW51 is arranged in parallel with the 1-1, 2-1, 3-1 and 4-1 main routing wires TW11, TW21, TW31 and TW41. The 4-1a and 4-1b auxiliary routing wires TW41a and TW41b are connected to the 4-1 touch/common electrode Tx41 via at least one second contact holes CH2, respectively. The 4-1a and 4-1b auxiliary routing wires TW41a and TW41b are arranged in parallel with the 1-1 to 5-1 main routing wires TW11 to TW51. The 4-1a and 4-1b auxiliary routing wires TW41a and TW41b are disposed in the area corresponding to the 4-1 touch/common electrode Tx41.

The 1-2 touch and common electrode Tx12 among the touch and common electrodes Tx12 to Tx52 disposed in a second column is connected to the 1-2 main routing wire TW12 via at least one first contact hole CH1. The 1-2 main routing wire TW12 is overlapped with the 2-2 to 5-2 touch/common electrodes Tx22 to Tx52 disposed in the second column but is not connected to them. The 1-2 main the routing wire TW12 is arranged in parallel with the 2-2 to 5-2 main routing wires TW22 to TW52. The 1-2a and 1-2b auxiliary routing wires TW12a and TW12b are connected to the 1-2 touch/common electrode Tx12 via at least one second contact holes CH2, respectively. The 1-2a and 1-2b auxiliary routing wires TW12a and TW12b are arranged in parallel with the 1-2 to 5-2 main routing wires TW12 to TW52. The 1-2a and 1-2b auxiliary routing wires TW12a and TW12b are disposed in the area corresponding to the 1-2 touch and common electrode Tx12.

The 2-2 combination touch and common electrode Tx22 among the touch/common electrodes Tx12 to Tx52 disposed in the second column is connected to the 2-2 main routing wire TW22 via at least one first contact hole CH1. The 2-2 main routing wire TW22 is overlapped with the 1-2, 3-2, 4-2 and 5-2 touch/common electrodes Tx12, Tx32, Tx42 and Tx52 disposed in the second column but is not connected to them. The 2-2 main the routing wire TW22 is arranged in parallel with the 1-2, 3-2, 4-2 and 5-2 main routing wires TW12, TW32, TW42 and TW52. The 2-2a and 2-2b auxiliary routing wires TW22a and TW22b are connected to the 2-2 touch/common electrode Tx22 via at least one second contact holes CH2, respectively. The 2-2a and 2-2b auxiliary routing wires TW22a and TW22b are arranged in parallel with the 1-2 to 5-2 main routing wires TW12 to TW52. The 2-2a and 2-2b auxiliary routing wires TW22a and TW22b are disposed in the area corresponding to the 2-2 touch/common electrode Tx22.

The 3-2 touch/common electrode Tx32 among the touch/common electrodes Tx12 to Tx52 disposed in the second column is connected to the 3-2 main routing wire TW32 via at least one first contact hole CH1. The 3-2 main routing wire TW32 is overlapped with the 1-2, 2-2, 4-2 and 5-2 touch/common electrodes Tx12, Tx22, Tx42 and Tx52 disposed in the second column but is not connected to them. The 3-2 main the routing wire TW32 is arranged in parallel with the 1-2, 2-2, 4-2 and 5-2 main routing wires TW12, TW22, TW42 and TW52. The 3-2a and 3-2b auxiliary routing wires TW32a and TW32b are connected to the 3-2 touch/common electrode Tx32 via at least one second contact holes CH2, respectively. The 3-2a and 3-2b auxiliary routing wires TW32a and TW32b are arranged in parallel with the 1-2 to 5-2 main routing wires TW12 to TW52. The 3-2a and 3-2b auxiliary routing wires TW32a and TW32b are disposed in the area corresponding to the 3-2 touch and common electrode Tx32.

The 4-2 combination touch and common electrode Tx42 among the touch/common electrodes Tx12 to Tx52 disposed in the second column is connected to the 4-2 main routing wire TW42 via at least one first contact hole CH1. The 4-2 main routing wire TW42 is overlapped with the 1-2, 2-2, 3-2 and 5-2 touch/common electrodes Tx12, Tx22, Tx32 and Tx52 disposed in the second column but is not connected to them. The 4-2 main the routing wire TW42 is arranged in parallel with the 1-2, 2-2, 3-2 and 5-2 main routing wires TW12, TW22, TW32 and TW52. The 4-2a and 4-2b auxiliary routing wires TW42a and TW42b are connected to the 4-2 touch/common electrode Tx42 via at least one second contact holes CH2, respectively. The 4-2a and 4-2b auxiliary routing wires TW42a and TW42b are arranged in parallel with the 1-2 to 5-2 main routing wires TW12 to TW52. The 4-2a and 4-2b auxiliary routing wires TW42a and TW42b are disposed in the area corresponding to the 4-2 touch and common electrode Tx42.

The 5-2 touch/common electrode Tx52 among the touch/common electrodes Tx12 to Tx52 disposed in the second column is connected to the 5-2 main routing wire TW52 via at least one first contact hole CH1. The 5-2 main routing wire TW52 is overlapped with the 1-2, 2-2, 3-2 and 4-2 touch/common electrodes Tx12, Tx22, Tx32 and Tx42 disposed in the second column but is not connected to them. The 5-2 main the routing wire TW52 is arranged in parallel with the 1-2, 2-2, 3-2 and 4-2 main routing wires TW12, TW22, TW32 and TW42. The 5-2a and 5-2b auxiliary routing wires TW52a and TW52b are connected to the 5-2 touch/common electrode Tx52 via at least one second contact holes CH2, respectively. The 5-2a and 5-2b auxiliary routing wires TW52a and TW52b are arranged in parallel with the 1-2 to 5-2 main routing wires TW12 to TW52. The 5-2a and 5-2b auxiliary routing wires TW52a and TW52b are disposed in the area corresponding to the 5-2 touch/common electrode Tx52.

The 1-3 touch/common electrode Tx13 among the touch/common electrodes Tx13 to Tx53 disposed in a third column is connected to the 1-3 main routing wire TW13 via at least one first contact hole CH1. The 1-3 main routing wire TW13 is overlapped with the 2-3 to 5-3 touch/common electrodes Tx23 to Tx53 disposed in the third column but is not connected to them. The 1-3 main the routing wire TW13 is arranged in parallel with the 2-3 to 5-3 main routing wires TW23 to TW53. The 1-3a and 1-3b auxiliary routing wires TW13a and TW13b are connected to the 1-3 touch/common electrode Tx13 via at least one second contact holes CH2, respectively. The 1-3a and 1-3b auxiliary routing wires TW13a and TW13b are arranged in parallel with the 1-3 to 5-3 main routing wires TW13 to TW53. The 1-3a and 1-3b auxiliary routing wires TW13a and TW13b are disposed in the area corresponding to the 1-3 touch/common electrode Tx13.

The 2-3 touch/common electrode Tx23 among the touch/common electrodes Tx13 to Tx53 disposed in the third column is connected to the 2-3 main routing wire TW23 via at least one first contact hole CH1. The 2-3 main routing wire TW23 is overlapped with the 1-3, 3-3, 4-3 and 5-3 touch/common electrodes Tx13, Tx33, Tx43 and Tx53 disposed in the third column but is not connected to them. The 2-3 main the routing wire TW23 is arranged in parallel with the 1-3, 3-3, 4-3 and 5-3 main routing wires TW13, TW33, TW43 and TW53. The 2-3a and 2-3b auxiliary routing wires TW23a and TW23b are connected to the 2-3 touch/common electrode Tx23 via at least one second contact holes CH2, respectively. The 2-3a and 2-3b auxiliary routing wires TW23a and TW23b are arranged in parallel with the 1-3 to 5-3 main routing wires TW13 to TW53. The 2-3a and 2-3b auxiliary routing wires TW23a and TW23b are disposed in the area corresponding to the 2-3 touch and common electrode Tx23.

The 3-3 touch/common electrode Tx33 among the touch/common electrodes Tx13 to Tx53 disposed in the third column is connected to the 3-3 main routing wire TW33 via at least one first contact hole CH1. The 3-3 main routing wire TW33 is overlapped with the 1-3, 2-3, 4-3 and 5-3 touch/common electrodes Tx13, Tx23, Tx43 and Tx53 disposed in the third column but is not connected to them. The 3-3 main the routing wire TW33 is arranged in parallel with the 1-3, 2-3, 4-3 and 5-3 main routing wires TW13, TW23, TW43 and TW53. The 3-3a and 3-3b auxiliary routing wires TW33a and TW33b are connected to the 3-3 touch/common electrode Tx33 via at least one second contact holes CH2, respectively. The 3-3a and 3-3b auxiliary routing wires TW33a and TW33b are arranged in parallel with the 1-3 to 5-3 main routing wires TW13 to TW53. The 3-3a and 3-3b auxiliary routing wires TW33a and TW33b are disposed in the area corresponding to the 3-3 touch and common electrode Tx33.

The 4-3 touch/common electrode Tx43 among the touch/common electrodes Tx13 to Tx53 disposed in the third column is connected to the 4-3 main routing wire TW43 via at least one first contact hole CH1. The 4-3 main routing wire TW43 is overlapped with the 1-3, 2-3, 3-3 and 5-3 touch/common electrodes Tx13, Tx23, Tx33 and Tx53 disposed in the third column but is not connected to them. The 4-3 main the routing wire TW43 is arranged in parallel with the 1-3, 2-3, 3-3 and 5-3 main routing wires TW13, TW23, TW33 and TW53. The 4-3a and 4-3b auxiliary routing wires TW43a and TW43b are connected to the 4-3 touch/common electrode Tx43 via at least one second contact holes CH2, respectively. The 4-3a and 4-3b auxiliary routing wires TW43a and TW43b are arranged in parallel with the 1-3 to 5-3 main routing wires TW13 to TW53. The 4-3a and 4-3b auxiliary routing wires TW43a and TW43b are disposed in the area corresponding to the 4-3 touch/common electrode Tx43.

The 5-3 touch/common electrode Tx53 among the touch/common electrodes Tx13 to Tx53 disposed in the third column is connected to the 5-3 main routing wire TW53 via at least one first contact hole CH1. The 5-3 main routing wire TW53 is overlapped with the 1-3, 2-3, 3-3 and 4-3 touch/common electrodes Tx13, Tx23, Tx33 and Tx43 disposed in the third column but is not connected to them. The 5-3 main the routing wire TW53 is arranged in parallel with the 1-3, 2-3, 3-3 and 4-3 main routing wires TW13, TW23, TW33 and TW43. The 5-3a and 5-3b auxiliary routing wires TW53a and TW53b are connected to the 5-3 touch/common electrode Tx53 via at least one second contact holes CH2, respectively. The 5-3a and 5-3b auxiliary routing wires TW53a and TW53b are arranged in parallel with the 1-3 to 5-3 main routing wires TW13 to TW53. The 5-3a and 5-3b auxiliary routing wires TW53a and TW53b are disposed in the area corresponding to the 5-3 touch and common electrode Tx53.

The 1-4 touch/common electrode Tx14 among the touch/common electrodes Tx14 to Tx54 disposed in a fourth column is connected to the 1-4 main routing wire TW14 via at least one first contact hole CH1. The 1-4 main routing wire TW14 is overlapped with the 2-4 to 5-4 touch/common electrodes Tx24 to Tx54 disposed in the fourth column but is not connected to them. The 1-4 main the routing wire TW14 is arranged in parallel with the 2-4 to 5-4 main routing wires TW24 to TW54. The 1-4a and 1-4b auxiliary routing wires TW14a and TW14b are connected to the 1-4 touch/common electrode Tx14 via at least one second contact holes CH2, respectively. The 1-4a and 1-4b auxiliary routing wires TW14a and TW14b are arranged in parallel with the 1-4 to 5-4 main routing wires TW14 to TW54. The 1-4a and 1-4b auxiliary routing wires TW14a and TW14b are disposed in the area corresponding to the 1-4 touch and common electrode Tx14.

The 2-4 touch/common electrode Tx24 among the touch/common electrodes Tx14 to Tx54 disposed in a fourth column is connected to the 2-4 main routing wire TW24 via at least one first contact hole CH1. The 2-4 main routing wire TW24 is overlapped with the 1-4, 3-4, 4-4 and 5-4 touch/common electrodes Tx14, Tx34, Tx44 and Tx54 disposed in the fourth column but is not connected to them. The 2-4 main the routing wire TW24 is arranged in parallel with the 1-4, 3-4, 4-4 and 5-4 main routing wires TW14, TW34, TW44 and TW54. The 2-4a and 2-4b auxiliary routing wires TW24a and TW24b are connected to the 2-4 touch/common electrode Tx24 via at least one second contact holes CH2, respectively. The 2-4a and 2-4b auxiliary routing wires TW24a and TW24b are arranged in parallel with the 1-4 to 5-4 main routing wires TW14 to TW54. The 2-4a and 2-4b auxiliary routing wires TW24a and TW24b are disposed in the area corresponding to the 2-4 touch and common electrode Tx24.

The 3-4 touch/common electrode Tx34 among the touch/common electrodes Tx14 to Tx54 disposed in the fourth column is connected to the 3-4 main routing wire TW34 via at least one first contact hole CH1. The 3-4 main routing wire TW34 is overlapped with the 1-4, 2-4, 4-4 and 5-4 touch/common electrodes Tx14, Tx24, Tx44 and Tx54 disposed in the fourth column but is not connected to them. The 3-4 main the routing wire TW34 is arranged in parallel with the 1-4, 2-4, 4-4 and 5-4 main routing wires TW14, TW24, TW44 and TW54. The 3-4a and 3-4b auxiliary routing wires TW34a and TW34b are connected to the 3-4 touch/common electrode Tx34 via at least one second contact holes CH2, respectively. The 3-4a and 3-4b auxiliary routing wires TW34a and TW34b are arranged in parallel with the 1-4 to 5-4 main routing wires TW14 to TW54. The 3-4a and 3-4b auxiliary routing wires TW34a and TW34b are disposed in the area corresponding to the 3-4 touch/common electrode Tx34.

The 4-4 touch/common electrode Tx44 among the touch/common electrodes Tx14 to Tx54 disposed in the fourth column is connected to the 4-4 main routing wire TW44 via at least one first contact hole CH1. The 4-4 main routing wire TW44 is overlapped with the 1-4, 2-4, 3-4 and 5-4 touch/common electrodes Tx14, Tx24, Tx34 and Tx54 disposed in the fourth column but is not connected to them. The 4-4 main the routing wire TW44 is arranged in parallel with the 1-4, 2-4, 3-4 and 5-4 main routing wires TW14, TW24, TW34 and TW54. The 4-4a and 4-4b auxiliary routing wires TW44a and TW44b are connected to the 4-4 touch/common electrode Tx44 via at least one second contact holes CH2, respectively. The 4-4a and 4-4b auxiliary routing wires TW44a and TW44b are arranged in parallel with the 1-4 to 5-4 main routing wires TW14 to TW54. The 4-4a and 4-4b auxiliary routing wires TW44a and TW44b are disposed in the area corresponding to the 4-4 touch and common electrode Tx44.

The 5-4 touch/common electrode Tx54 among the touch/common electrodes Tx14 to Tx54 disposed in the fourth column is connected to the 5-4 main routing wire TW54 via at least one first contact hole CH1. The 5-4 main routing wire TW54 is overlapped with the 1-4, 2-4, 3-4 and 4-4 touch/common electrodes Tx14, Tx24, Tx34 and Tx44 disposed in the fourth column but is not connected to them. The 5-4 main the routing wire TW54 is arranged in parallel with the 1-4, 2-4, 3-4 and 4-4 main routing wires TW14, TW24, TW34 and TW44. The 5-4a and 5-4b auxiliary routing wires TW54a and TW54b are connected to the 5-4 touch/common electrode Tx54 via at least one second contact holes CH2, respectively. The 5-4a and 5-4b auxiliary routing wires TW54a and TW54b are arranged in parallel with the 1-4 to 5-4 main routing wires TW14 to TW54. The 5-4a and 5-4b auxiliary routing wires TW54a and TW54b are disposed in the area corresponding to the 5-4 touch and common electrode Tx54.

In the embodiment as shown in FIGS. 4 and 5, the touch/common electrodes are arranged in five rows and pixel electrodes are arranged in four columns and three rows and seven columns to correspond to the one touch and common electrode. But the embodiment as shown in FIGS. 4 and 5 is one example, and is not to limit the scope of the invention. Therefore, the number of the touch and common electrodes and a relationship between pixel electrodes and one touch and common electrode may be modified, if necessary or desired.

Figure 6A:
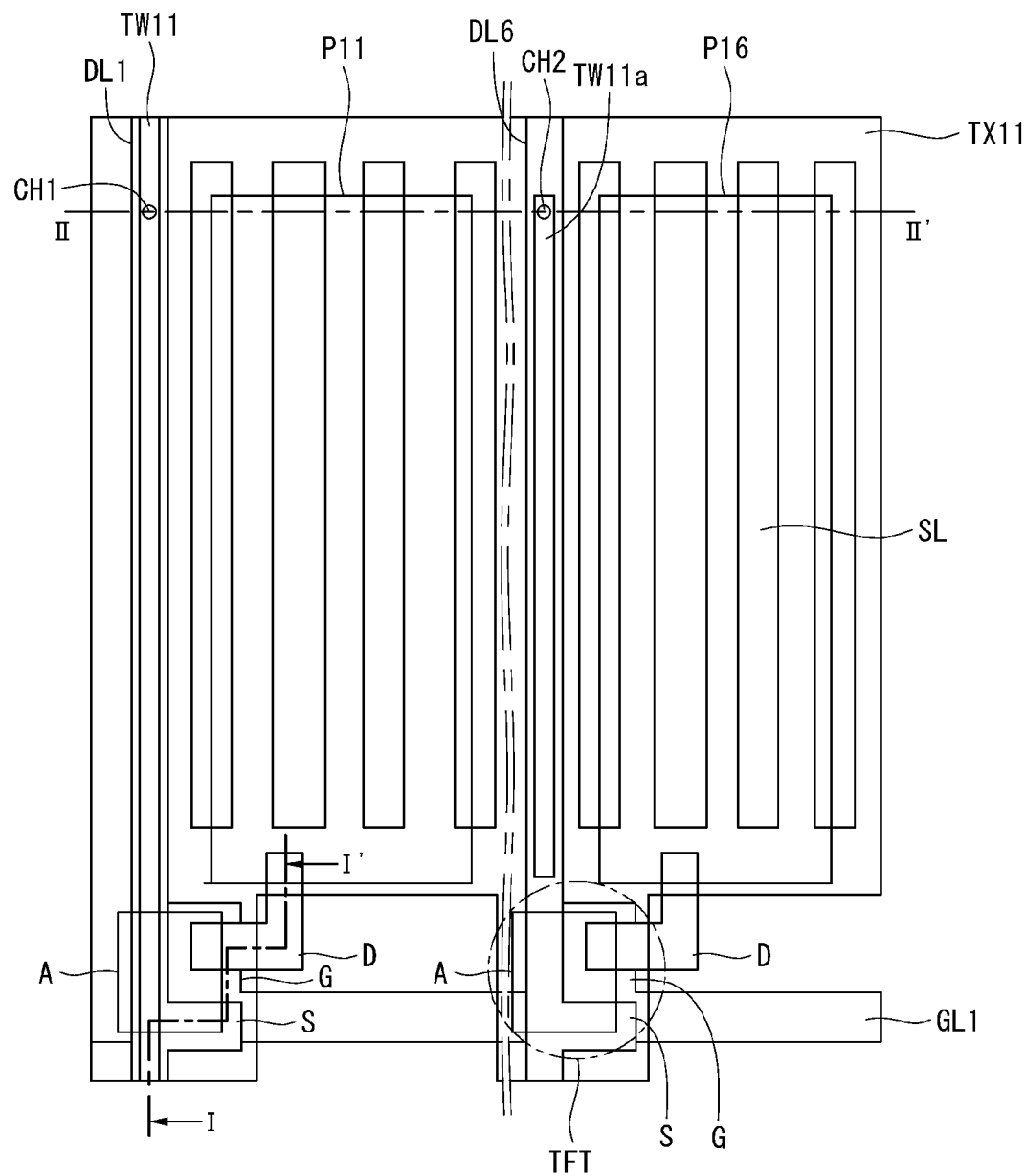
FIG. 6A is a planar view illustrating a region R3 shown in FIG. 5.

Next, a construction of the touch sensor integrated display device according to the embodiment of the disclosure is described in detail with reference to FIGS. 6A and 6B. FIG. 6A is a planar view illustrating a region R3 shown in FIG. 5, and FIG. 6B is a cross-sectional view taken along line I-I' of FIG. 6A.

Figure 6B:
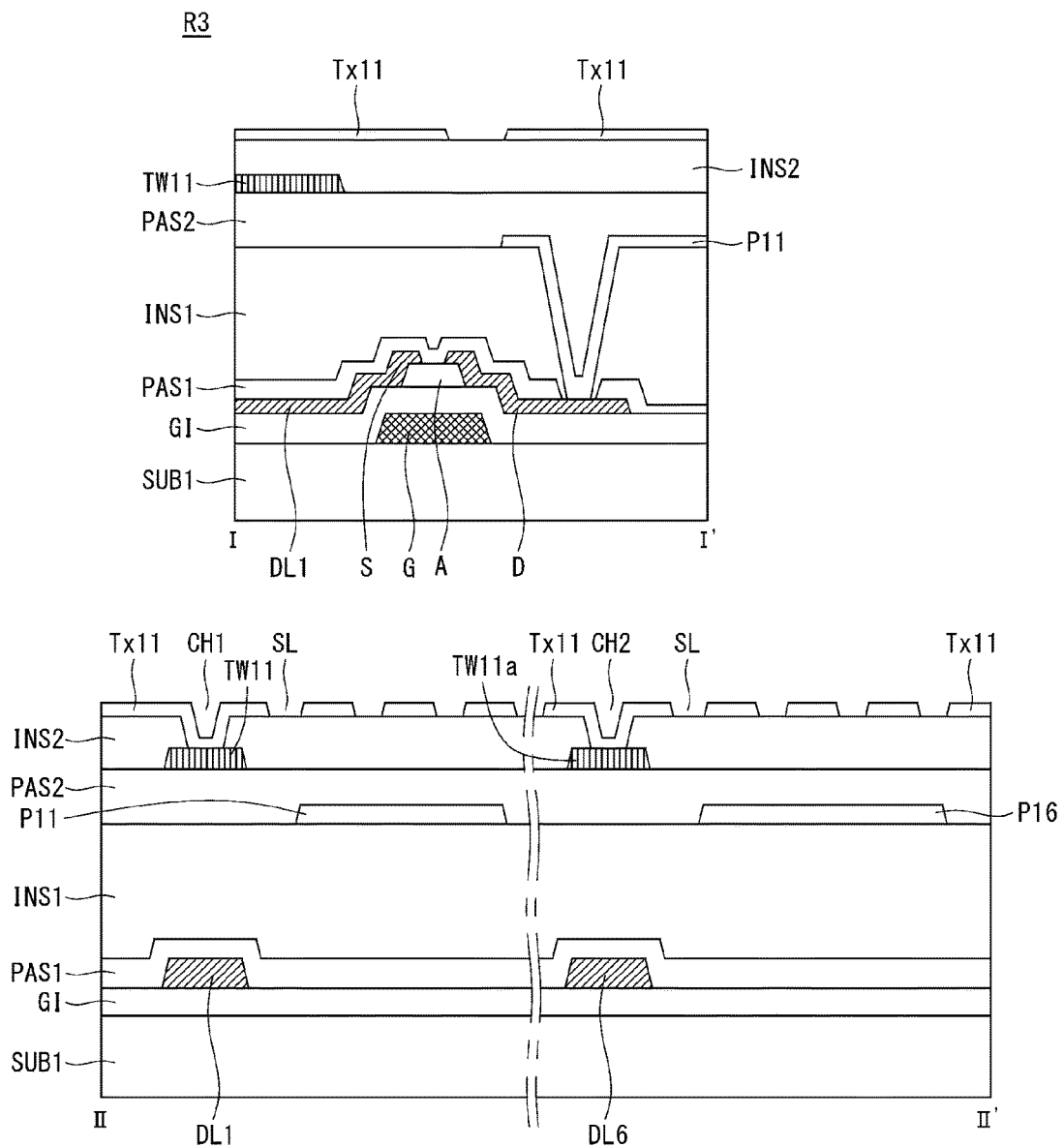
FIG. 6B is a cross-sectional view taken along line I-I' of FIG. 6A.

Referring to FIGS. 5, 6A and 6B, the touch sensor integrated type display device according to the embodiment of the disclosure includes the gate lines GL1 to GL3 and the data lines DL1 to DL7, thin film transistors (TFTs), pixel electrodes P11 to P37, and a touch/common electrode Tx11. The gate lines GL1 to GL3 and the data lines DL1 to DL7 are disposed to cross over each other on the substrate SUB1 of the TFT array TFTA. The thin film transistors (TFTs) are disposed to be near crossings of the gate lines GL1 to GL3 and the data lines DL1 to DL7. The pixel electrodes P11 to P66 are disposed in areas defined by the crossing of the gate lines GL1 to GL6 and the data lines DL1 to DL7. The touch/common electrode Tx11 serves as the common electrode positioned opposite the pixel electrodes P11 to P66. The touch/common electrode Tx11 performs a function of the common electrode during a display operation, and performs a function of the touch/common electrode in a touch operation.

In the above configuration of the display device, the plurality of gate lines GL1 to GL3 are disposed on the substrate SUB1 in parallel with one another. A gate insulating layer GI is disposed on the substrate SUB1 to cover the gate lines GL1 to GL3. An active layer A, a source electrode S, and a drain electrode D constituting the thin film transistor are disposed on the gate insulating layer GI.

Each thin film transistor includes a gate electrode G, an active layer A, a source electrode S and a drain electrode D. The gate electrode G is extended from each of the gate lines GL1 to GL3 disposed on the substrate SUB1. The active layer A is disposed on the gate insulating layer GI covering the gate lines GL1 to GL3 to correspond to the gate electrode G The source electrode S and the drain electrode D are separated from each other on the gate insulating layer GI so as to expose a portion of the active layer A. The source electrode S extends from each of the data lines DL1 to DL7.

An embodiment of the disclosure has been described, as an example, a thin film transistor having a gate bottom structure, in which the gate electrode is formed under the source and drain electrodes, but is not limited to this example. It should be understood that a thin film transistor having a gate top structure, in which the gate electrode is formed on the source and drain electrodes, may be used. Since the thin film transistor having the gate top structure is known to those in the art, a detailed description thereof will be omitted.

A first passivation layer PAS1 are disposed on the gate insulating layer GI to cover the pixel electrodes P11 to P67. On the gate insulating layer GI, the thin film transistors and the data lines DL1 to DL6 are disposed. A first insulating layer INS1 for planarization is disposed on the first passivation layer PAS1. The first passivation layer PAS1 has a through hole exposing a portion of the drain electrode D.

The pixel electrodes P11 to P37 are disposed in pixel areas on the first insulating layer INS1. The first insulating layer INS1 has a contact hole exposing the portion of the drain electrode D exposed via the through hole. Each of the pixel electrodes P11 to P37 is respectively connected to the drain electrodes D of the thin film transistors via the contact hole passing through the first insulating layer INS1 and the first passivation layer PAS1.

A second passivation layer PAS2 is disposed on the first insulating layer INS1 to cover the pixel electrodes P11 to P67.

The main routing wires TW11, TW21, TW31, TW41 and TW51 and the auxiliary routing wires TW11a, TW11b are disposed on the second passivation layer PAS2.

A second insulating layer INK is disposed on the second passivation layer PAS2 to cover the main routing wires TW11, TW21, TW31, TW41 and TW51 and the auxiliary routing wires TW11a, TW11b. The second insulating layer INS2 has at least one first contact hole CH1 and at least one second contact hole CH2. The at least one first contact hole CH1 exposes a portion of the main routing wire TW11. The at least one second contact hole CH2 exposes a portion of the auxiliary routing wire TW11a and TW11b.

The touch/common electrode Tx11 is disposed on the second insulating layer INS2 to cover the main routing wires TW11, TW21, TW31, TW41 and TW51 and the auxiliary routing wires TW11a, TW11b. The touch/common electrode Tx11 overlaps the pixel electrodes P11 to P37. The touch/common electrode Tx11 is connected to the main routing wires TW11 via the first contact hole CH1, and to the auxiliary routing wires TW11a and TW11b via the second contact holes CH2. The touch/common electrode Tx11 has a plurality of slits SL to form a horizontal electric field together with the pixel electrodes P11 to P37.

The touch sensor integrated type display device according to the embodiment of the disclosure is driven by a time-division scheme in which each frame period is time-divided into a display operation period and a touch operation period.

In the time-division scheme, the touch operation is stopped during the display operation period, and the display operation is stopped during the touch period.

As described above, the touch sensor integrated type display device according to the first embodiment of the disclosure has the main routing wires and auxiliary routing wires overlapped with all data lines disposed in an area corresponding to each touch/common electrode. The electric field formed between the data lines and the pixel electrodes is blocked by the main routing wires and auxiliary routing wires. Accordingly, it is possible to prevent display defect such as mura phenomenon due to light leakage because the electric field between the data lines and the pixel electrodes does not affect the liquid crystal layer of the display device.

According to the first embodiment of the disclosure, it is possible to reduce display defect of the touch sensor integrated type display device because number of main and auxiliary routing wires overlapped with one touch/display electrode is same.

For example, five main routing wires TW11, TW21, TW31, TW41 and TW51 and two auxiliary routing wires TW11a and TW11b overlap 1-1 touch and common electrode Tx11. Also, another five main routing wires TW12, TW22, TW32, TW42 and TW52 and another two auxiliary routing wires TW12a and TW12b overlap 1-2 touch and common electrode Tx12. In this way, each of the touch and common electrodes overlaps five main routing wires TW11, TW21, TW31, TW41 and TW51 and two auxiliary routing wires TW11a and TW11b.

The driving integrate chip 100 supplies a common voltage or a touch driving voltage to the five main routing wires TW11, TW21, TW31, TW41, TW41 and TW12, TW22, TW32, TW42, TW42. Also the touch/common electrodes Tx11 and Tx12 supply the common voltage or the touch driving voltage received from the five main routing wires TW11, TW21, TW31, TW41, TW41 and TW12, TW22, TW32, TW42, TW42 to the two auxiliary routing wires TW11a, TW11b and TW12a, TW12b.

Accordingly, it is possible to reduce the display defect due to the main and auxiliary routing wires because electric field in each touch and common electrode by the main and auxiliary routing wires is uniform.

Figure 7:
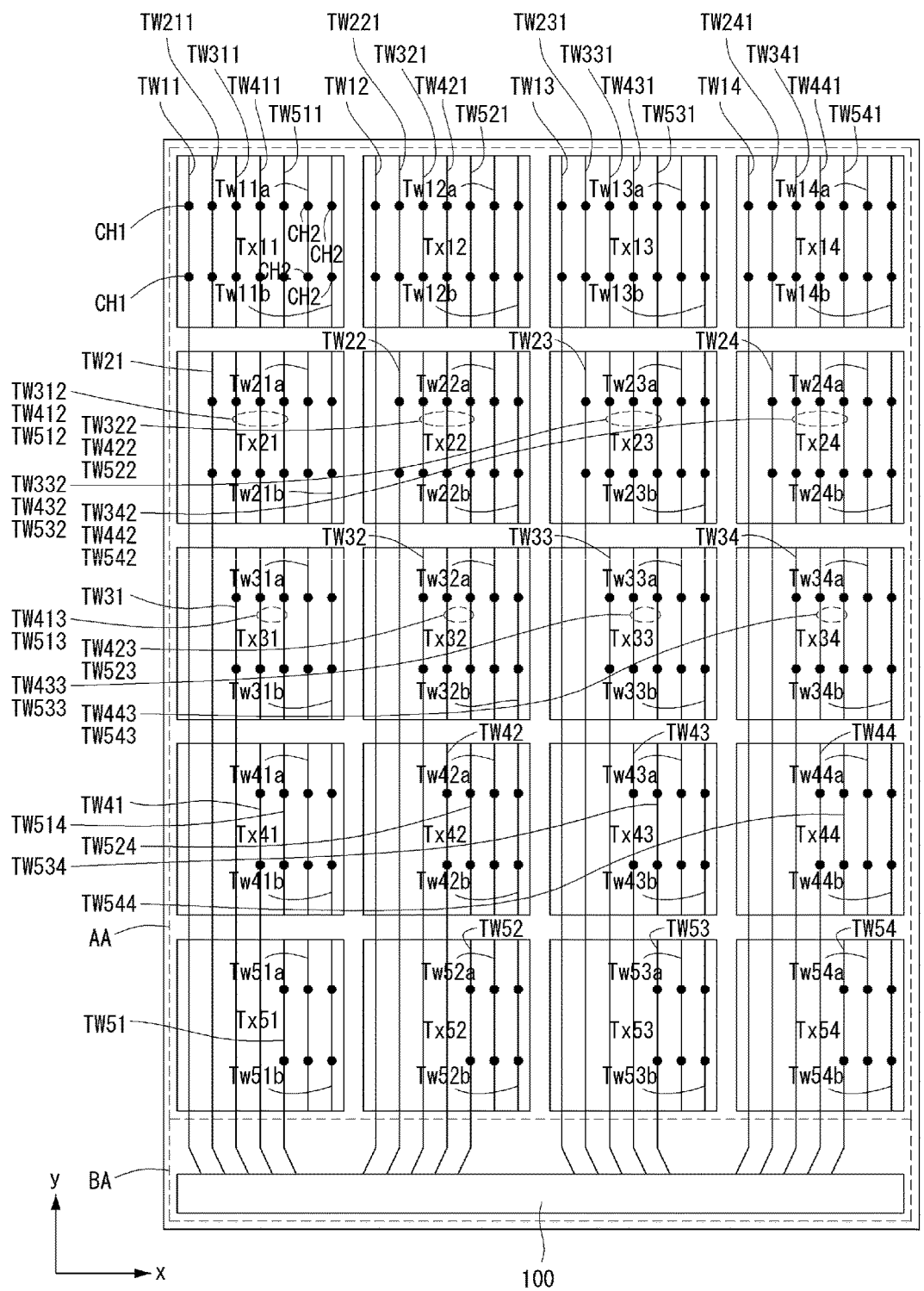
FIG. 7 is a planar view illustrating a touch sensor integrated type display device according to a second exemplary embodiment of the disclosure.

Next, the touch sensor integrated type display device according to a second embodiment of the invention will be described with reference to FIG. 7. FIG. 7 FIG. 7 is a planar view illustrating a touch sensor integrated type display device according to second exemplary embodiment of the invention.

The touch sensor integrated type display device according to the second embodiment of the disclosure is substantially similar to the touch sensor integrated type display device according to the first embodiment of the invention, except only the main routing wire connected to one touch/common electrode starts therefrom, passes through touch/common electrodetouch/common electrodes disposed in the same column as the one touch/common electrode, and is connected to the driving integrated chip 100, and the second auxiliary routing wires are disposed in every area overlapping the touch/common electrode through an imaginary line passes. The imaginary lines are extended from connection points of the main routing wires and the touch/common electrodes to the driving integrated chip 100. Thus, a difference between the second embodiment and the first embodiment is described below.

In the touch sensor integrated type display device of the second embodiment of the disclosure, lengths of the main routing wires TW11~TW51, TW12~TW52, TW13~TW53, and TW14~TW54 connected to touch/common electrodes Tx11~Tx51, Tx12~Tx52, Tx13~Tx53, and Tx14~Tx54 disposed in a same column are different from each other. Also, lengths of the main routing wires TW11~TW14, TW21~TW24, TW31~TW34, TW41~TW44, and TW51~TW54 connected to touch/common electrodes Tx11~Tx14, Tx21~Tx24, Tx31~Tx34, Tx41~Tx44, and Tx51~Tx54 disposed in a same row are same.

The length of the first routing wire and the second routing wire disposed in corresponding to each touch/common electrode is same.

In concrete, the lengths of the main routing wires TW11, TW21, TW31, TW41 and TW51 connected to touch/common electrodes Tx11, Tx21, Tx31, Tx41 and Tx51 disposed in a first column are different from each other. The lengths of the main routing wires TW12, TW22, TW32, TW42 and TW52 connected to touch/common electrodes Tx12, Tx22, Tx32, Tx42 and Tx52 disposed in a second column are different from each other. The lengths of the main routing wires TW13, TW23, TW33, TW43 and TW53 connected to touch/common electrodes Tx13, Tx23, Tx33, Tx43 and Tx53 disposed in a third column are different from each other. The lengths of the main routing wires TW14, TW24, TW34, TW44 and TW54 connected to touch/common electrodes Tx1, Tx2, Tx3, Tx44 and Tx54 disposed in a fourth column are different from each other.

In contrast, the lengths of the main routing wires TW11, TW12, TW13 and TW14 connected to touch/common electrodes Tx11, Tx12, Tx13 and Tx14 disposed in a first row are same to each other. The lengths of the main routing wires TW21, TW22, TW23 and TW24 connected to touch/common electrodes Tx21, Tx22, Tx23 and Tx24 disposed in a second row are same to each other. The lengths of the main routing wires TW31, TW32, TW33 and TW34 connected to touch/common electrodes Tx31, Tx32, Tx33 and Tx34 disposed in a third row are same to each other. The lengths of the main routing wires TW41, TW42, TW43 and TW44 connected to touch/common electrodes Tx41, Tx42, Tx43 and Tx44 disposed in a fourth row are same to each other. The lengths of the main routing wires TW51, TW52, TW53 and TW54 connected to touch/common electrodes Tx51, Tx52, Tx53 and Tx54 disposed in a fifth row are same to each other.

In the touch sensor integrated type display device of the second embodiment of the disclosure, there are touch/common electrodes through which any main routing wire does not pass due to the different length of the main routing wires. There are second routing wires at positions where imaginary lines extended from the main routing wires overlap the touch/common electrodes. The length of the second auxiliary routing wire is the same as the length of the first auxiliary routing wire disposed on area corresponding to each touch/common electrode.

For example, second auxiliary routing wires TW211, TW311, TW411 and TW511 are disposed on an area corresponding to the 1-1 touch electrode Tx11 positioned at a first column and a first row. The second auxiliary routing wire TW211 is disposed to overlap the imaginary line extended from the main routing wire TW21 connected to the touch/common electrode Tx21 positioned at the first column and a second row. The second auxiliary routing wire TW311 is disposed to overlap the imaginary line extended from the main routing wire TW31 connected to the touch/common electrode Tx31 positioned at the first column and a third row. The second auxiliary routing wire TW411 is disposed to overlap the imaginary line extended from the main routing wire TW41 connected to the touch/common electrode Tx41 positioned at the first column and a fourth row. The second auxiliary routing wire TW511 is disposed to overlap the imaginary line extended from the main routing wire TW51 connected to the touch/common electrode Tx51 positioned at the first column and a fifth row. The length of the second auxiliary routing wires TW211, TW311, TW411 and TW511 are same to the length of the first auxiliary routing wires Tw11a and Tw11b disposed on an area corresponding to the touch/common electrode Tx11.

In this way, the second auxiliary routing wires disposed on areas corresponding to the touch/common electrodes Tx11 to Tx14, Tx21 to Tx24, Tx31 to Tx34 and Tx41 to Tx44 except for the touch/common electrodes Tx51 to Tx54 positioned at the last row.

As described above, the touch sensor integrated type display device according to the second embodiment of the disclosure has the main routing wires and first and second auxiliary routing wires overlapped with all data lines disposed in an area corresponding to each touch and common electrode. The electric field formed between the data lines and the pixel electrodes is blocked by the main routing wires and auxiliary routing wires. Accordingly, it is possible to prevent display defect such as mura phenomenon due to light leakage because the electric field between the data lines and the pixel electrodes does not affect the liquid crystal layer of the display device.

According to the second embodiment of the invention, it is possible to reduce display defect of the touch sensor integrated type display device because a total number of the main and auxiliary routing wires overlapped with every touch/display electrode is same.

For example, one main routing wire TW11, four first auxiliary routing wires TW211, TW311, TW411 and TW511, and two second auxiliary routing wires TW11a and TW11b overlap 1-1 touch/common electrode Tx11. Also, another one main routing wire TW12, another four first auxiliary routing wires TW221, TW321, TW421 and TW521, and another two second auxiliary routing wires TW12a and TW12b overlap 1-2 touch/common electrode Tx12. In this way, each of the touch/common electrodes overlaps seven routing wires.

In the touch sensor integrated type display device according to the second embodiment of the disclosure, the driving integrated chip 100 supplies a common voltage or a touch driving voltage to the touch and common electrodes Tx11 to Tx54 via the main routing wires TW11 to TW54. Also the touch/common electrodes Tx11 and Tx12 supply the common voltage or the touch driving voltage received from the one first main routing wire TW11 and TW12 to the main routing wires and first auxiliary routing wires TW211 to TW511, TW221 to TW521, TW231 to TW531, TW241 to TW541, TW312 to TW512, TW322 to TW522, TW332 to TW532, TW342 to TW542, TW413 to TW513, TW423 to TW523, TW433 to TW533, TW443 to TW543, TW514, TW524, TW534 and TW544 and the second auxiliary routing wires TW11a to TW11b, TW12a to TW12b, TW13a to TW13b, TW14a to TW14b, TW21a to TW21b, TW22a to TW22b, TW23a to TW23b, TW24a to TW24b, TW31a to TW31b, TW32a to TW32b, TW33a to TW33b, TW34a to TW34b, TW41a to TW41b, TW42a to TW42b, TW43a to TW43b, TW44a to TW44b, TW51a to TW51b, TW52a to TW52b, TW53a to TW53b and TW54a to TW54b.

In the touch sensor integrated type display device according to the second embodiment of the disclosure, electric field in each touch/common electrode by the main routing wires, and the first and second auxiliary routing wires is uniform because the main routing wires, and the first and second auxiliary routing wires receive a same signal. Accordingly, it is possible to reduce the display defect due to the main routing wires and auxiliary routing wires.

While example embodiments of the present invention have been described in detail with reference to the drawings, it will be understood by those skilled in the art that the invention can be implemented in other specific forms without changing the technical spirit or essential features of the invention.

For example, the first direction is referred to a x-axis direction and the second direction is referred to as y-axis direction in the description of the embodiments, the first and second directions should be understood as directions crossed over to each other. Also, sizes, shapes and numbers of the touch and common electrodes, the pixel electrodes, the main and auxiliary routing wires and so on and arrangement thereof are selected for clarity.

Also, the arrangement of the main and auxiliary routing wires has a construction in which the main routing wires are disposed at left side in one touch and common electrode and the auxiliary routing wires are disposed at right side in the same touch and common electrode. But the invention is not limited thereto. The main routing wires may be disposed at right side in one touch and common electrode and the auxiliary routing wires may be disposed at left side in the same touch and common electrode. Otherwise, the main routing and the auxiliary routing wires may be alternately disposed.

Also, the self capacitive type touch sensor integrated type display devices are described as examples in the embodiments of the invention. The invention may be applied to mutual capacitive type touch sensor integrated type display devices if the main routing wires and auxiliary routing wires are overlapped with all data lines disposed in an area corresponding to each touch and common electrode.

Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A touch sensor integrated type display device having an active area and a bezel area outside the active area, comprising:
    a plurality of gate lines and a plurality of data lines configured to cross over each other;
    a plurality of pixel electrodes configured to be disposed between the plurality of data lines;
    a plurality of touch/common electrodes, each of the plurality of touch/common electrodes configured to be overlapped with m×n pixel electrodes in the active area, wherein the m is a number of the pixel electrodes arranged in a first direction and the n is a number of the pixel electrodes arranged in a second direction crossing the first direction, and the m and n are a positive integer same to or larger than two;
    a plurality of main routing wires, each of the plurality of main routing wires being connected to a corresponding one of the plurality of touch/common electrode, and extended from the active area to one side of the bezel area; and
    a plurality of auxiliary routing wires configured to be connected to a corresponding one of the plurality of touch/common electrodes in an area corresponding to the each touch/electrode, and to be in parallel with the plurality of main routing wires, wherein each of the plurality of touch/common electrodes is connected to a same number of auxiliary routing wires;

wherein a number of main routing wires connected to each of the touch/common electrodes adjacent to each other in the active area is same and each of the main routing wires overlaps with a same number of the touch/common; and wherein all of the plurality of auxiliary routing wires that are connected to the corresponding one of the plurality of touch/common electrodes are to one side of a main routing wire connected to the corresponding one of the plurality of touch/common electrodes.

2. The touch sensor integrated type display device of claim 1, wherein the plurality of main routing wires have a same length in the active area.

3. The touch sensor integrated type display device of claim 1, wherein each of the plurality of main routing wires and each of the at least one auxiliary routing wire overlap a corresponding one of the plurality of data lines, respectively.

4. The touch sensor integrated type display device of claim 2, wherein a number of the touch/common electrodes arranged on a same line of the second direction is smaller than the m.

5. The touch sensor integrated type display device of claim 1, further comprising:
    a plurality of thin film transistors disposed near crossings of the plurality of gate lines and the plurality of data lines;
    a first insulating layer to cover the plurality of thin film transistors and the plurality of data lines;
    a second insulating layer disposed on the first insulating layer to cover the plurality of pixel electrodes which are disposed on the first insulating layer; and
    a third insulating layer disposed on the second insulating layer to cover the main routing wires and the auxiliary routing wires which are disposed on the second insulating layer,
    wherein each of the main routing wires is connected to the corresponding one of the plurality of touch/common electrodes via at least one fist contact hole in the third insulating layer, and
    the at least one auxiliary routing wire is connected to the corresponding one of the plurality of touch/common electrode via at least one second contact hole in the third insulating layer.

6. The touch sensor integrated type display device of claim 1, wherein lengths of main routing wires connected to touch/common electrodes disposed in a same row are same to each other in the active area, and lengths of main routing wires connected to touch/common electrodes disposed in a same column are different from each other in the active area, and
    the at least one auxiliary routing wire includes:
    a first set of auxiliary routing wires arranged on each of the plurality of touch/common electrodes at positions getting out of the main routing wires and imaginary lines linearly extended from the main routing wires; and
    a second set of auxiliary routing wires arranged on each of the plurality of touch/common electrodes at positions of the imaginary lines.

7. The touch sensor integrated type display device of claim 6, wherein lengths of the first auxiliary electrodes are a same length as lengths of the second auxiliary electrodes.

8. The touch sensor integrated type display device of claim 6, wherein each of the plurality of main routing wires, and the first set of auxiliary wires and the second set of auxiliary routing wires overlap a corresponding one of the plurality of data lines.

9. The touch sensor integrated type display device of claim 6, wherein a number of the touch/common electrodes arranged on a same line of the second direction is smaller than the m.

10. The touch sensor integrated type display device of claim 6, further comprising:
    a plurality of thin film transistors disposed near crossings of the plurality of gate lines and the plurality of data lines;
    a first insulating layer to cover the plurality of thin film transistors and the plurality of data lines;
    a second insulating layer disposed on the first insulating layer to cover the plurality of pixel electrodes which are disposed on the first insulating layer; and
    a third insulating layer disposed on the second insulating layer to cover the main routing wires and the first set of auxiliary routing wires and the second set of auxiliary routing wires which are disposed on the second insulating layer,
    wherein each of the main routing wires is connected to the corresponding one of the plurality of touch/common electrode via at least one fist contact hole in the third insulating layer, and
    each of the first set of auxiliary routing wires and the second set of auxiliary routing wires are connected to a corresponding one of touch/common electrodes via at least one second contact hole in the third insulating layer.

11. A touch sensor integrated type display device having an active area and a bezel area outside the active area, comprising:
    a plurality of gate lines;
    a plurality of data lines configured to cross over the plurality of gate lines;
    a plurality of pixel electrodes configured to be disposed between the plurality of data lines;
    a plurality of touch/common electrodes including a first touch/common electrode and a second touch/common electrode, each of the plurality of touch/common electrodes configured to be overlapped with m pixel electrodes arranged in a first direction and n pixel electrodes arranged in a second direction crossing the first direction in the active area, wherein m and n are a positive integer same to or larger than two;
    a plurality of main routing wires, each of the plurality of main routing wires configured to be respectively connected to a corresponding one of the plurality of touch/common electrodes, be arranged in parallel with each other, and be overlapped with some of the plurality of data lines;
    a plurality of auxiliary routing wires configured to be connected to the plurality of touch/common electrodes, and to be overlapped with others of the plurality of data lines, wherein each of the plurality of touch/common electrodes is connected to a same number of auxiliary routing wires; and
    a driving circuit that outputs a touch driving signal to the plurality of touch/common electrodes, the touch driving signal output to the plurality of touch/common electrodes via the plurality of main routing wires but not output via the plurality of auxiliary routing wires, and wherein the first touch/common electrode is farther from the driving circuit than the second touch/common electrode is from the driving circuit, and wherein a first main routing wire that connects the first touch/common electrode to the driving circuit overlaps with the first touch/common electrode and the second touch/common electrode, and a second main routing wire that connects the second touch/common electrode to the driving circuit overlaps with the first touch/common electrode and the second touch/common electrode; and wherein all of a plurality of auxiliary routing wires that are connected to a touch/common electrode from the plurality of touch/common electrodes are to one side of a main routing wire that is connected to the touch/common electrode.

12. The touch sensor integrated type display device of claim 11, wherein the plurality of main routing wires have a same length in the active area.

13. The touch sensor integrated type display device of claim 11, wherein a number of the touch/common electrodes arranged on one line of the second direction is smaller than the m.

14. The touch sensor integrated type display device of claim 11, wherein the at least one auxiliary routing wire is independently disposed on the each touch/common electrode.

15. The touch sensor integrated type display device of claim 11, wherein the plurality of auxiliary routing wire includes:
  a first set of auxiliary routing wires arranged on each of the plurality of touch/common electrodes at positions getting out of the plurality of main routing wires and imaginary lines linearly extended from the plurality of main routing wires; and
  a second set of auxiliary routing wires arranged on each of the plurality of touch/common electrodes at positions of the imaginary lines.

16. The touch sensor integrated type display device of claim 11, further comprising:
  a plurality of thin film transistors disposed near crossings of the plurality of gate lines and the plurality of data lines;
  a first insulating layer configured to cover the plurality of thin film transistors and the plurality of data lines;
  a second insulating layer disposed on the first insulating layer to cover the plurality of pixel electrodes which are disposed on the first insulating layer; and
  a third insulating layer disposed on the second insulating layer to cover the main routing wires and the auxiliary routing wires which are disposed on the second insulating layer,
  wherein each of the plurality of main routing wires is connected to the corresponding one of the plurality of touch/common electrode via at least one fist contact hole in the third insulating layer, and
  each of the plurality of auxiliary routing wires is connected to the corresponding one of the plurality of touch/common electrode via at least one second contact hole in the third insulating layer.

17. The touch sensor integrated type display device of claim 15, further comprising:
  a plurality of thin film transistors disposed near crossings of the plurality of gate lines and the plurality of data lines;
  a first insulating layer to cover the plurality of thin film transistors and the plurality of data lines;
  a second insulating layer disposed on the first insulating layer to cover the plurality of pixel electrodes which are disposed on the first insulating layer; and
  a third insulating layer disposed on the second insulating layer to cover the main routing wires and the first set of auxiliary routing wires and the second set of auxiliary routing wires which are disposed on the second insulating layer,
  wherein each of the plurality of main routing wires is connected to the corresponding one of the plurality of touch/common electrode via at least one fist contact hole in the third insulating layer, and
  each of the first set of auxiliary routing wires and the second set of auxiliary routing wires is connected to a corresponding one of touch/common electrodes via at least one second contact hole in the third insulating layer.

18. A touch sensor integrated type display device having an active area and a bezel area outside the active area, comprising:
  a plurality of gate lines and a plurality of data lines configured to cross over each other;
  a plurality of pixel electrodes configured to be disposed between the plurality of data lines;
  a plurality of touch/common electrodes, each of the plurality of touch/common electrodes configured to form electric fields with m×n pixel electrodes in the active area, wherein the m is a number of the pixel electrodes arranged in a first direction and the n is a number of the pixel electrodes arranged in a second direction crossing the first direction, and the m and n are a positive integer same to or larger than two;
  a plurality of main routing wires, each of the plurality of main routing wires being connected to a corresponding one of the plurality of touch/common electrode, and extended from the active area to one side of the bezel area; and
  a plurality of auxiliary routing wires configured to be connected to a corresponding one of the plurality of touch/common electrodes in an area corresponding to the each touch/common electrode, and to be in parallel with the plurality of main routing wires,
  wherein the plurality of touch/common electrodes include a 1-1 touch/common electrode, a 1-2 touch/common electrode, a 2-1 touch/common electrode and a 2-2 touch/common electrode,
  wherein the 1-2 touch/common electrode disposed below the 1-1 touch/common electrode, the 2-1 touch/common electrode disposed at the right side of the 1-1 touch/common electrode with a first gap and the 2-2 touch/common electrode disposed at the right side of the 1-2 touch/common electrode with a second gap,
  wherein other touch/common electrodes does not disposed in the first gap and the second gap,
  wherein the plurality of main routing wires include a 1-1 main routing wire, a 1-2 main routing wire, 2-1 main routing wire and 2-2 main routing wire,
  wherein the 1-1 main routing wire is electrically connected to the 1-1 touch/common electrode, the 1-2 main routing wire is electrically connected to the 1-2 touch/common electrode, the 2-1 main routing wire is electrically connected to the 2-1 touch/common electrode, the 2-2 main routing wire is electrically connected to the 2-2 touch/common electrode,
  wherein the 1-1 main routing wire overlaps with the 1-1 touch/common electrode and the 1-2 touch/common electrode, the 1-2 main routing wire overlaps with the 1-2 touch/common electrode, the 2-1 main routing wire overlaps with the 2-1 touch/common electrode and the 2-2 touch/common electrode, the 2-2 main routing wire overlaps with the 2-2 touch/common electrode, wherein the plurality of auxiliary routing wires include a 1-1-a auxiliary routing wire, a 1-1-b auxiliary routing wire, a 1-2-a auxiliary routing wire, a 2-1-a auxiliary routing wire, a 2-1-b auxiliary routing wire and a 2-2-a auxiliary routing wire, wherein the 1-1-a auxiliary routing wire and the 1-1-b auxiliary routing wire are electrically connected to the 1-1 touch/common electrode, the 1-2-a auxiliary routing wire is electrically connected to the 1-2 touch/common electrode, the 2-1-a auxiliary routing wire and the 2-1-b auxiliary routing wire are electrically connected to the 2-1 touch/common electrode, the 2-2-a auxiliary routing wire is electrically connected to the 2-2 touch/common electrode, wherein the plurality of data lines include a 1-1 data line, a 1-2 data line, a 1-3 data line, a 2-1 data line, a 2-2 data line and a 2-3 data line, wherein the 1-1 data line overlaps with the 1-1 main routing wire, the 1-2 data line overlaps with the 1-2 main routing wire and the 1-1-a auxiliary routing wire, the 1-3 data line overlaps with the 1-1-b auxiliary routing wire and the 1-2-a auxiliary routing wire, wherein the 2-1 data line overlaps with the 2-1 main routing wire, the 2-2 data line overlaps with the 2-2 main routing wire and the 2-1-a auxiliary routing wire, the 2-3 data line overlaps with the 2-1-b auxiliary routing wire and the 2-2-a auxiliary routing wire.

\* \* \* \* \*